US 12,475,566 B2

(12) United States Patent
Riem et al.

(10) Patent No.: US 12,475,566 B2
(45) Date of Patent: Nov. 18, 2025

(54) SYSTEMS AND METHODS FOR EXTREMITY ANALYSIS AND MODELING USING MEDICAL IMAGING

(71) Applicant: Springbok, Inc., Charlottesville, VA (US)

(72) Inventors: Lara Riem, Charlottesville, VA (US); Silvia Blemker, Charlottesville, VA (US); Xue Feng, Charlottesville, VA (US); Matthew Cousins, Charlottesville, VA (US); Olivia DuCharme, Charlottesville, VA (US)

(73) Assignee: SPRINGBOK, INC., Charlottesville, VA (US)

( * ) Notice: Subject to any disclaimer, the term of this patent is extended or adjusted under 35 U.S.C. 154(b) by 519 days.

(21) Appl. No.: 17/664,893

(22) Filed: May 25, 2022

(65) Prior Publication Data

US 2023/0386042 A1   Nov. 30, 2023

(51) Int. Cl.
*G06T 7/11* (2017.01)
*A61B 5/055* (2006.01)
(Continued)

(52) U.S. Cl.
CPC ............. *G06T 7/11* (2017.01); *A61B 5/055* (2013.01); *A61B 6/032* (2013.01); *A61B 6/50* (2013.01);
(Continued)

(58) Field of Classification Search
CPC .... G06V 40/172; G06V 10/945; G06V 40/50; G06V 10/74; G06F 2218/12; G06T 7/00; G06T 7/11; G06T 7/0014; G06T 7/337; G06T 7/62; G06T 7/74; G06T 11/005; G06T 2200/04; G06T 2207/10081; G06T 2207/10088; G06T 2207/20084; G06T 2207/30008; G06T 2207/20081; G06T 7/0012; A61B 5/055; A61B 6/032;
(Continued)

(56) References Cited

U.S. PATENT DOCUMENTS

2018/0326149 A1* 11/2018 Lipschultz ........... A61B 6/5205
2020/0167911 A1*  5/2020 Park ........................ G06T 7/11
(Continued)

FOREIGN PATENT DOCUMENTS

CN   111681251 B   *  9/2023  ............... G06T 7/11
EP     2937039 A1  * 10/2015  ............. A61B 5/055

OTHER PUBLICATIONS

Lim, Hyun Kyong, et al. "Visual MRI grading system to evaluate atrophy of the supraspinatus muscle." Korean journal of radiology 15.4 (2014): 501-507.
(Continued)

*Primary Examiner* — Oneal R Mistry
*Assistant Examiner* — Jongbong Nah
(74) *Attorney, Agent, or Firm* — QUARLES & BRADY LLP

(57) ABSTRACT

Systems and methods are provided for upper extremity analysis and modeling using medical imaging. The systems and methods may be used to identify and segment both muscle and fatty tissue directly from the standard clinical images, and may be fully automated, thus providing rapid assessments back to the clinician and seamless integration into the clinical decision-making workflow.

35 Claims, 10 Drawing Sheets

(51) Int. Cl.
| | |
|---|---|
| A61B 6/00 | (2024.01) |
| A61B 6/03 | (2006.01) |
| A61B 6/50 | (2024.01) |
| G06T 7/00 | (2017.01) |
| G06T 7/33 | (2017.01) |
| G06T 7/62 | (2017.01) |
| G06T 7/73 | (2017.01) |
| G06T 11/00 | (2006.01) |

(52) U.S. Cl.
CPC .......... *A61B 6/5217* (2013.01); *G06T 7/0014* (2013.01); *G06T 7/337* (2017.01); *G06T 7/62* (2017.01); *G06T 7/74* (2017.01); *G06T 11/005* (2013.01); *G06T 2200/04* (2013.01); *G06T 2207/10081* (2013.01); *G06T 2207/10088* (2013.01); *G06T 2207/20084* (2013.01); *G06T 2207/30008* (2013.01)

(58) Field of Classification Search
CPC ....... A61B 6/50; A61B 6/5217; A61B 5/4872; A61B 5/7267
See application file for complete search history.

(56) References Cited

U.S. PATENT DOCUMENTS

| | | | | |
|---|---|---|---|---|
| 2020/0242405 | A1* | 7/2020 | Georgescu | G06N 3/006 |
| 2022/0039868 | A1* | 2/2022 | Chaoui | G06N 3/084 |
| 2022/0392614 | A1* | 12/2022 | Schwier | G06N 3/045 |

OTHER PUBLICATIONS

Lädermann, Alexandre, et al. "Current concepts in the primary management of irreparable posterosuperior rotator cuff tears without arthritis." EFORT open reviews 3.5 (2018): 200-209.
McMonagle, J. Scott, and Emily N. Vinson. "MRI of the shoulder: Rotator cuff." Applied Radiology 41.4 (2012): 20.
Ashir, Aria, et al. "Magnetic resonance imaging of the shoulder." Polish journal of radiology 85.1 (2020): 420-439.
Kissenberth, Michael J., et al. "A positive tangent sign predicts the repairability of rotator cuff tears." Journal of Shoulder and Elbow Surgery 23.7 (2014): 1023-1027.
Kikukawa, Kenshi, et al. "Hypertrophic changes of the teres minor muscle in rotator cuff tears: quantitative evaluation by magnetic resonance imaging." Journal of Shoulder and Elbow Surgery 23.12 (2014): 1800-1805.
Yoon, Sung-Hyun, et al. "Restoration of supraspinatus and infraspinatus deep plane occupation ratios was greater in delaminated tears than in non-delaminated tears after rotator cuff repair." Journal of Orthopaedics 20 (2020): 32-40.
Jeong, Jeung Yeol, et al. "Supraspinatus muscle occupation ratio predicts rotator cuff reparability." Journal of shoulder and elbow surgery 26.6 (2017): 960-966.
Yoo, Jae-Sung, et al. "The supraspinatus occupation ratios of both the > 50% articular-and bursal-side partial-thickness rotator cuff tears were low and the infraspinatus occupation ratio of the > 50% bursal-side partial-thickness rotator cuff tears was low." Knee Surgery, Sports Traumatology, Arthroscopy 27.12 (2019): 3871-3880.
Gerber, Christian, et al. "Correlation of atrophy and fatty infiltration on strength and integrity of rotator cuff repairs: a study in thirteen patients." Journal of shoulder and elbow surgery 16.6 (2007): 691-696.
Gladstone, James N., et al. "Fatty infiltration and atrophy of the rotator cuff do not improve after rotator cuff repair and correlate with poor functional outcome." The American journal of sports medicine 35.5 (2007): 719-728.
Lansdown, Drew A., et al. "A prospective, quantitative evaluation of fatty infiltration before and after rotator cuff repair." Orthopaedic journal of sports medicine 5.7 (2017): 2325967117718537.

Davis, Derik L., et al. "Association of patient self-reported shoulder scores to quantitative and semiquantitative MRI measures of rotator cuff intramuscular fatty infiltration: a pilot study." American Journal of Roentgenology 213.6 (2019): 1307-1314.
Vidt, Meghan E., et al. "Assessments of fatty infiltration and muscle atrophy from a single magnetic resonance image slice are not predictive of 3-dimensional measurements." Arthroscopy: The Journal of Arthroscopic & Related Surgery 32.1 (2016): 128-139.
Fuchs, Bruno, et al. "Fatty degeneration of the muscles of the rotator cuff: assessment by computed tomography versus magnetic resonance imaging." Journal of shoulder and elbow surgery 8.6 (1999): 599-605.
Beeler, Silvan, Eugene TH Ek, and Christian Gerber. "A comparative analysis of fatty infiltration and muscle atrophy in patients with chronic rotator cuff tears and suprascapular neuropathy." Journal of shoulder and elbow surgery 22.11 (2013): 1537-1546.
Davis, Derik L., et al. "Association of rotator cuff tear patterns and intramuscular fatty infiltration on magnetic resonance imaging." Journal of clinical imaging science 9 (2019): 38.
Ernstbrunner, Lukas, et al. "Scapular morphologic characteristics and rotator cuff tear pattern are independently associated with chronic pseudoparalyis: a matched-pair analysis of patients with massive rotator cuff tears." The American journal of sports medicine 48.9 (2020): 2137-2143.
Nozaki, Taiki, et al. "Predicting retear after repair of full-thickness rotator cuff tear: two-point Dixon MR imaging quantification of fatty muscle degeneration-initial experience with 1-year follow-up." Radiology 280.2 (2016): 500-509.
Santago, Anthony C., et al. "Quantitative analysis of three-dimensional distribution and clustering of intramuscular fat in muscles of the rotator cuff." Annals of biomedical engineering 44.7 (2016): 2158-2167.
Kim, Jung Youn, Ji Seon Park, and Yong Girl Rhee. "Can preoperative magnetic resonance imaging predict the reparability of massive rotator cuff tears ?. " The American Journal of Sports Medicine 45.7 (2017): 1654-1663.
Davis, Derik L., et al. "Correlation of quantitative versus semiquantitative measures of supraspinatus intramuscular fatty infiltration to shoulder range of motion and strength: a pilot study." Current problems in diagnostic radiology 50.5 (2021): 629-636.
Werthel, Jean-David, et al. "Three-dimensional muscle loss assessment: A novel computed tomography-based quantitative method to evaluate rotator cuff muscle fatty infiltration." Journal of Shoulder and Elbow Surgery 31.1 (2022): 165-174.
Werthel, Jean-David, et al. "CT-based volumetric assessment of rotator cuff muscle in shoulder arthroplasty preoperative planning." Bone & Joint Open 2.7 (2021): 552-561.
Ro, Kyunghan, et al. "Deep-learning framework and computer assisted fatty infiltration analysis for the supraspinatus muscle in MRI." Scientific reports 11.1 (2021): 15065.
McLendon, Paul B., et al. "Machine learning can predict level of improvement in shoulder arthroplasty." JBJS Open Access 6.1 (2021): 8 pages.
Shin, Yun Kyung, et al. "Predictive factors of retear in patients with repaired rotator cuff tear on shoulder MRI." American Journal of Roentgenology 210.1 (2018): 134-141.
Davis, Derik L., et al. "Reliability of supraspinatus intramuscular fatty infiltration estimates on T1-weighted MRI in potential candidates for rotator cuff repair surgery: full-thickness tear versus high-grade partial-thickness tear." Skeletal radiology 50.11 (2021): 2233-2243.
Lee, Dokwan, et al. "Threshold-based quantification of fatty degeneration in the supraspinatus muscle on MRI as an alternative method to Goutallier classification and single-voxel MR spectroscopy." BMC musculoskeletal disorders 21.1 (2020): 362.
Kim, Joo Young, et al. "Development of an automatic muscle atrophy measuring algorithm to calculate the ratio of supraspinatus in supraspinous fossa using deep learning." Computer methods and programs in biomedicine 182 (2019): 105063.
Gilbert, Fabian, et al. "Comparing the MRI-based Goutallier classification to an experimental quantitative MR spectroscopic fat measurement of the supraspinatus muscle." BMC Musculoskeletal Disorders 17.1 (2016): 355.

(56) References Cited

OTHER PUBLICATIONS

Khanna, Rajan, et al. "Development of 3D method to assess intramuscular spatial distribution of fat infiltration in patients with rotator cuff tear: reliability and concurrent validity." BMC musculoskeletal disorders 20.1 (2019): 295.

Patterson, Brendan M., et al. "Correlation of Patient-Reported Outcomes Measurement Information System (PROMIS) scores with legacy patient-reported outcome scores in patients undergoing rotator cuff repair." Journal of shoulder and elbow surgery 27.6 (2018): S17-S23.

Pietroski, Alexander D., et al. "Patient-Reported Outcomes Measurements Information System (PROMIS) upper extremity and pain interference do not significantly predict rotator cuff tear dimensions." JSES international 6.1 (2022): 56-61.

Rothrock, Nan E., Dagmar Amtmann, and Karon F. Cook. "Development and validation of an interpretive guide for PROMIS scores." Journal of patient-reported outcomes 4.1 (2020): 16.

Pfirrmann, Christian WA, et al. "Assessment of fat content in supraspinatus muscle with proton MR spectroscopy in asymptomatic volunteers and patients with supraspinatus tendon lesions." Radiology 232.3 (2004): 709-715.

Chung, Seok Won, et al. "Is the supraspinatus muscle atrophy truly irreversible after surgical repair of rotator cuff tears ?. " Clinics in orthopedic surgery 5.1 (2013): 55.

Goutallier, Daniel, et al. "Fatty muscle degeneration in cuff ruptures: pre-and postoperative evaluation by CT scan." Clinical Orthopaedics and Related Research® 304 (1994): 78-83.

Lin, James C., Nancy Weintraub, and Dixie R. Aragaki. "Nonsurgical treatment for rotator cuff injury in the elderly." Journal of the American Medical Directors Association 9.9 (2008): 626-632.

Tempelhof, Siegbert, Stefan Rupp, and Romain Seil. "Age-related prevalence of rotator cuff tears in asymptomatic shoulders." Journal of shoulder and elbow surgery 8.4 (1999): 296-299.

Colvin, Alexis Chiang, et al. "National trends in rotator cuff repair." JBJS 94.3 (2012): 227-233.

Alaia, Erin F., and Naveen Subhas. "Shoulder MR imaging and MR arthrography techniques: new advances." Magnetic Resonance Imaging Clinics 28.2 (2020): 153-163.

* cited by examiner

SYSTEMS AND METHODS FOR EXTREMITY ANALYSIS AND MODELING USING MEDICAL IMAGING

STATEMENT REGARDING FEDERALLY SPONSORED RESEARCH

This invention was made with government support under R41AR078720-01A1 awarded by The National Institutes of Health. The government has certain rights in the invention.

CROSS-REFERENCE TO RELATED APPLICATIONS

N/A

BACKGROUND

Rotator cuff tear injury presents a significant and costly clinical problem. Rotator cuff tears are highly prevalent, but remain a very challenging clinical problem, which causes pain and a limited range of motion resulting in functional disability. Roughly 20% to 50% of those 60 years of age have a known rotator cuff tear and the prevalence increases with age. Nonsurgical or surgical treatments are available to treat rotator cuff tears, and proper evaluation of the patient is required to develop a treatment plan that would lead to the most favorable outcome. Over 250,000 rotator cuff repair surgeries are performed in the United States every year and this number has increased substantially each year since then, making rotator cuff repairs the second most common orthopedic soft tissue repair procedure performed.

Unfortunately, the outcomes of rotator cuff repair surgeries remain highly variable, despite the evolution of surgical techniques and available materials and frequency of the procedures. The goal in rotator cuff repair is to restore connection of the rotator cuff tendons to the proximal humerus and to release the impingement in the subacromial area without damaging the coracoacromial arch. As a result, the tendons of the rotator cuff are allowed to transmit forces from their muscular attachments to the insertion on the humerus thereby re-establishing the native force-couple that exists to compress and depress the humerus in the glenoid fossa allowing for normal joint movement.

Thus, there is a need for new systems and methods to improve clinical outcomes of clinical procedures addressing injuries of the upper extremities, such as rotator cuff injuries.

SUMMARY OF THE DISCLOSURE

The present disclosure addresses the aforementioned drawbacks by providing systems and methods for upper extremity analysis and modeling using medical imaging. The systems and methods may be used to identify and segment both muscle and fatty tissue directly from the standard clinical images, and may be fully automated, thus providing rapid assessments back to the clinician and seamless integration into the clinical decision-making workflow.

In accordance with one aspect of the disclosure, a system is provided for generating a report providing information regarding a clinical prognosis. The system can include a memory configured to store a plurality of a medical images of an upper extremity of a subject and a processor configured to access the plurality of medical images of the upper extremity of the subject stored in the memory. The processor is configured to segment the plurality of images based on at least muscle and fat and determine at least one of extra-muscular fat or intra-muscular fat using segmentation of the plurality of images. The processor is further configured to quantify at least one of structural volume, muscle volume, or fat infiltration in the upper extremity of the subject using the segmentation of the plurality of images and the determined at least one of extra-muscular fat or intra-muscular fat and generate a report providing information indicating pre-surgical or a post-surgical prognosis for the upper extremity including at least the muscle volume or fat infiltration ratio.

In one configuration, a computer-implemented method is provided for automatic muscle and fat segmentation using at least one processor. The method includes accessing image data acquired by a medical imaging system. The method also includes segmenting at least one muscle in the image data using an artificial intelligence network. The method also includes segmenting fat in the image data using the artificial intelligence network. The method also includes generating label maps by combining the fat segmented image data with the muscle segmented image data. The method also includes determining at least one of extra-muscular fat or intra-muscular fat based on the label maps and quantifying muscle volume for the at least one muscle and a fat infiltration ratio based on the determined at least one of extra-muscular fat or intra-muscular fat.

In one configuration, a system is provided for automatic muscle and fat segmentation. The system includes a computer system configured to: i) access image data acquired by a medical imaging system; ii) segment at least one muscle in the image data using an artificial intelligence network; iii) segment fat in the image data using the artificial intelligence network; iv) generate label maps by combining the fat segmented image data with the muscle segmented image data; v) determine at least one of intra-muscular fat or extra-muscular fat based on the label maps; and vi) quantify muscle volume for the at least one muscle and a fat infiltration ratio based on the determined at least one of intra-muscular or extra-muscular fat.

In one configuration, a computer-implemented method for automatic image registration is provided. The method includes accessing image data acquired by a medical imaging system that includes data from a plurality of scans. The method also includes determining a total length for a bone in a region of interest of the image data. The method also includes determining a location of an anatomical feature of the bone shared between different scans in the image data. The method also includes estimating a percent distance into the bone based on the location of the anatomical feature and the total length of the bone for each of the plurality of scans. The method also includes generating, using the estimated percent distance into the bone, at least one of a registration of the plurality of scans in the image data or a report of cumulative volume to the percent distance of the bone.

The foregoing and other aspects and advantages of the present disclosure will appear from the following description. In the description, reference is made to the accompanying drawings that form a part hereof, and in which there is shown by way of illustration a preferred embodiment. This embodiment does not necessarily represent the full scope of the invention, however, and reference is therefore made to the claims and herein for interpreting the scope of the invention. Like reference numerals will be used to refer to like parts from Figure to Figure in the following description.

DETAILED DESCRIPTION

Figure 1:
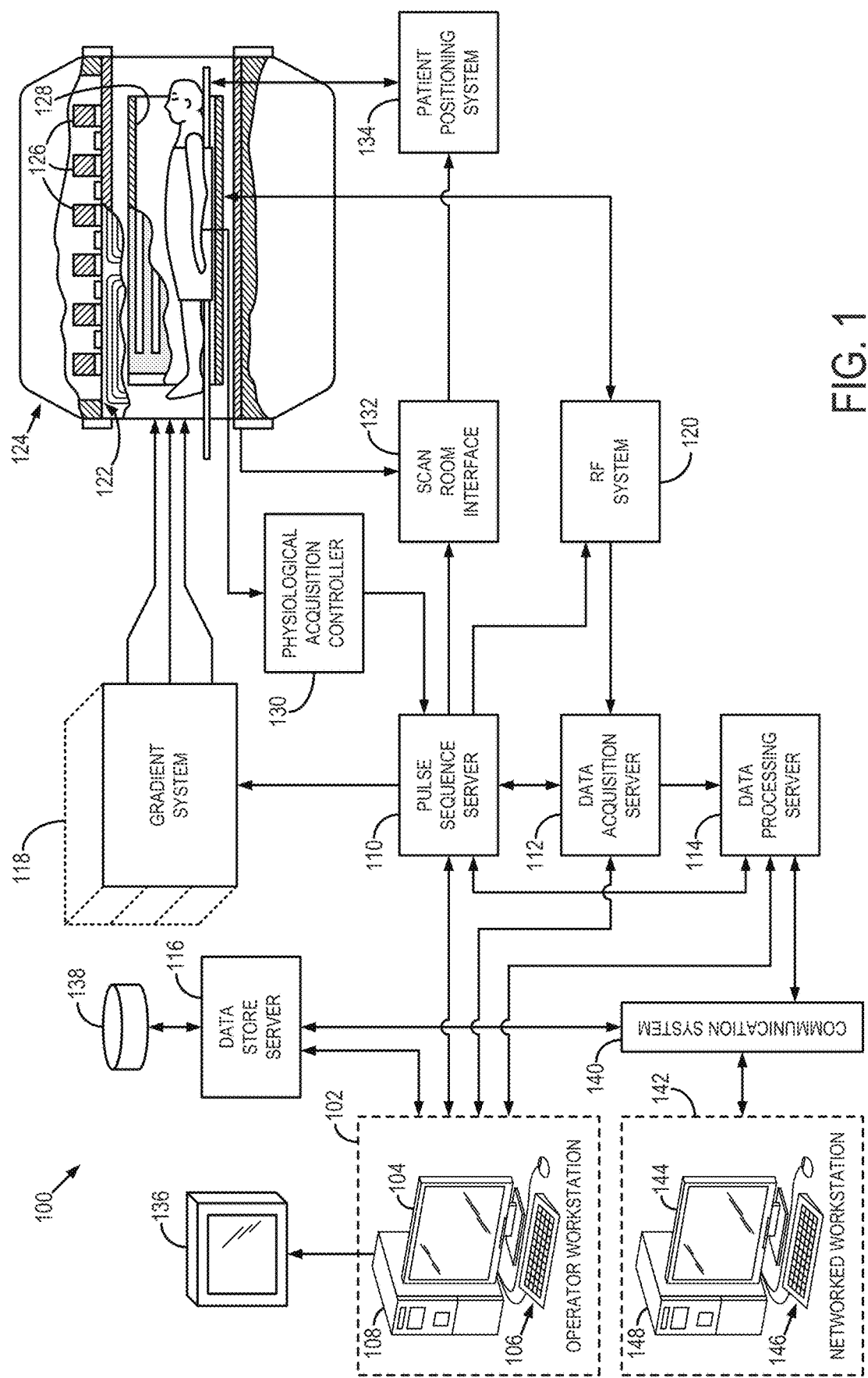
FIG. 1 is a block diagram of a non-limiting example MRI system that can implement the methods described in accordance with the present disclosure.

The present disclosure recognizes that muscle atrophy and fat infiltration of the rotator cuff muscles play a significant role in determining functional outcome after cuff repair. Elevated levels of fat infiltration are shown to be important contraindications for successful rotator cuff tendon repair because of the high likelihood of a poor functional outcome, increased likelihood of a re-tear, and unlikely reversal of the fatty infiltration after surgery. Assessment of fat infiltration is used to development treatment plans. Since muscle atrophy and fat infiltration are shown to lead to poor surgical outcomes, some have attempted to assess muscle quality from magnetic resonance images (MRI) and/or computed tomography images preoperatively in patients. For example, some have aimed to qualitatively score the muscles in four stages; stage 0 (normal muscle with absence of fat infiltration), stage 1 (muscle containing fat streaks), stage 2 (fat infiltration with overall more muscle than fat), stage 3 (fat infiltration with equal fat and muscle), and stage 4 (fat infiltration with more fat than muscle). While the intent of this scoring system is to quantify the relative percentage of muscle and fat in the image, the assessment is entirely subjective, and limited to analysis of only a narrow region within the muscle.

Thus, prior attempts at scoring systems have been shown to have low reliability. The present disclosure recognizes a clinical need for more objective methods to quantify muscle atrophy and fat infiltration. Further, prior attempts have only analyzed one single image slice view of all the rotator cuff muscles. However, the present disclosure recognizes that the three-dimensional anatomy of these muscles is complex and, thus, evaluation of only a single slice does not accurately capture the atrophy and fat infiltration of all the muscles. Therefore, the present disclosure recognizes that complex anatomical and biomechanical features of the shoulder indicate three-dimensional assessments of fat infiltration is advantageous but unavailable in an objective or reproducible way. The anatomy of the rotator cuff muscle-tendon complex is complex.

The present disclosure recognizes that the rotator cuff is comprised of four muscle-tendon complexes, including the supraspinatus, infraspinatus, teres minor, and subscapularis muscles. Together, the force that comes from these four muscles act to compress and depress the humerus in the glenoid fossa enabling normal movement. In order to properly assess the presence of fat infiltration, new approaches have been developed that incorporate advanced imaging sequences, such as two-point Dixon imaging and related fat-and-water separation techniques using MRI to quantify rotator cuff fat fraction. Notably, significantly higher preoperative fat fraction in rotator cuff muscles has been found with failed repair, and patients with failed repair demonstrated advanced fat infiltration on follow-up MR imaging. Further, a lack of correlation has been demonstrated between a subjective scoring system and quantitative, three-dimensional estimates of fat infiltration in the rotator cuff. Fat infiltration is also non-uniform throughout each muscle, emphasizing the need for incorporating more than a single-slice measure of fat infiltration.

Thus, the present disclosure recognizes that there remains a need for quantitative measures of fat infiltration to facilitate the clinical decision making for the treatment of upper extremity injuries, such as rotator cuff injury. However, the present disclosure also recognizes that previous imaging sequences that have been used are not clinical standards and analysis of the images under these protocols required substantial manual processing, such as segmentation, time in order to make the measurements. As such, there is no quantitative measures for use in a clinical workflow.

Image segmentation, also known as pixel-level classification, is the process of partitioning all pixels in an image into a finite number of semantically non-overlapping segments. In medical imaging, image segmentation has been considered a fundamental process for various medical applications including tissue identification, disease diagnosis, prognosis, and treatments.

Machine learning has demonstrated enormous success in improving diagnostic accuracy, speed of image interpretation, and clinical efficiency for a wide range of medical tasks, ranging from the interstitial pattern detection on chest CT images to bone age classification on hand radiographs. A data-driven approach with deep neural networks has also been utilized for several medical image segmentation applications. When successful, these implementations have relied upon the ability of machine learning to learn representative and hierarchical image features from data, rather than relying on manually engineered features based on knowledge from domain experts.

Automated image segmentation frequently produces errors that require manual correction based on visual analysis by highly-skilled radiologists. As a result, an automated segmentation process during a surgical procedure is both impractical due to the expense and time required, and not currently clinically available. Thus, there is a need for automated bone or tissue segmentation that is both accurate and with reduced errors that may be used in clinical practice. There is also a need to quickly, easily and accurately provide quantitative measures of both fat infiltration and atrophy of all four rotator cuff muscles. These measures would provide surgeons with much-needed pre-operative planning information that may significantly improve the outcomes of rotator cuff repair surgeries.

As will be described, the present disclosure provides systems and methods for automated medical image segmentation. The systems and methods may use machine learning with a quantitative assessment of the segmented structures. A machine learning routine, such as a convolutional neural network (CNN), artificial intelligence (AI), or a U-Net, and the like, may be structured and trained to perform image segmentation, such as for the upper extremity. In non-limiting examples, the segmentation may identify and mark in an image the tissues of the upper extremity, such as muscle and soft tissue, and the bones of the upper extremities, and the like. The images used for analysis do not need to be acquired in a specialized fashion. The segmentation may provide for automated identification of upper extremity tissues and structures, may provide for quantitative analysis of the segmented structures, and may provide for a real-time segmentation for use in a surgical environment.

In a non-limiting example, a rotator cuff segmentation AI system receives as input sagittal images of the shoulder taken during regular clinical practice and segments the humerus, clavicle, scapula, rotator cuff muscles (supraspinatus, infraspinatus, teres minor, subscapularis), the rotator cuffs respective intramuscular fat, and the like. Images input to the AI may include images taken from a clinical workflow and may include multiple slices. In a non-limiting example, images may be provided from a magnetic resonance imaging (MRI) system, and may include T1 weighted images.

Before subjecting the images to the AI system, the images may be preprocessed. As non-limiting example, the images may be corrected for orientation of the shoulder in the images based on scapula and/or subscapularis muscle, and the like. Images may be corrected for bias, and may be corrected so that the images all have the same pixel sizing. In a non-limiting example, if an image is 250×250 pixels with a resolution of 0.4 mm, it may be corrected and resized to match all of the images used, such as to be the same size of 0.7 pixel resolution→so (250*0.4)/0.7=new size.

The AI system may be trained using images that have been preprocessed and segmented, such that the respective intramuscular fat and muscle for each rotator cuff muscle are combined as one label. Such images may be used to train the AI on the bones and muscle and fat region. As a second training set, the intramuscular fat may be relabeled as one single entity. Other structures may be unlabeled.

In a non-limiting example, the AI system may run through the segmented image and respective label file in stages. A first stage may be used to train on labeling of the bones and muscle regions. A second stage may be used to train on labeling fat. During training, a specific image size (pixel× pixel×number of images) may be set. Each time the AI runs through the training, a patch of that size may be randomly selected within the training input. If the input is smaller than the patch, it may be zero padded.

Referring particularly now to FIG. 1, an example of an MRI system 100 that can implement the methods described here is illustrated. The MRI system 100 includes an operator workstation 102 that may include a display 104, one or more input devices 106 (e.g., a keyboard, a mouse), and a processor 108. The processor 108 may include a commercially available programmable machine running a commercially available operating system. The operator workstation 102 provides an operator interface that facilitates entering scan parameters into the MRI system 100. The operator workstation 102 may be coupled to different servers, including, for example, a pulse sequence server 110, a data acquisition server 112, a data processing server 114, and a data store server 116. The operator workstation 102 and the servers 110, 112, 114, and 116 may be connected via a communication system 140, which may include wired or wireless network connections.

The pulse sequence server 110 functions in response to instructions provided by the operator workstation 102 to operate a gradient system 118 and a radiofrequency ("RF") system 120. Gradient waveforms for performing a prescribed scan are produced and applied to the gradient system 118, which then excites gradient coils in an assembly 122 to produce the magnetic field gradients $G_x$, $G_y$, and $G_z$ that are used for spatially encoding magnetic resonance signals. The gradient coil assembly 122 forms part of a magnet assembly 124 that includes a polarizing magnet 126 and a whole-body RF coil 128.

RF waveforms are applied by the RF system 120 to the RF coil 128, or a separate local coil to perform the prescribed magnetic resonance pulse sequence. Responsive magnetic resonance signals detected by the RF coil 128, or a separate local coil, are received by the RF system 120. The responsive magnetic resonance signals may be amplified, demodulated, filtered, and digitized under direction of commands produced by the pulse sequence server 110. The RF system 120 includes an RF transmitter for producing a wide variety of RF pulses used in MRI pulse sequences. The RF transmitter is responsive to the prescribed scan and direction from the pulse sequence server 110 to produce RF pulses of the desired frequency, phase, and pulse amplitude waveform. The generated RF pulses may be applied to the whole-body RF coil 128 or to one or more local coils or coil arrays.

The RF system 120 also includes one or more RF receiver channels. An RF receiver channel includes an RF preamplifier that amplifies the magnetic resonance signal received by the coil 128 to which it is connected, and a detector that detects and digitizes the I and Q quadrature components of the received magnetic resonance signal. The magnitude of the received magnetic resonance signal may, therefore, be determined at a sampled point by the square root of the sum of the squares of the I and Q components:

$$M=\sqrt{I^2+Q^2} \tag{1}$$

and the phase of the received magnetic resonance signal may also be determined according to the following relationship:

$$\varphi = \tan^{-1}\left(\frac{Q}{I}\right). \tag{2}$$

The pulse sequence server 110 may receive patient data from a physiological acquisition controller 130. By way of example, the physiological acquisition controller 130 may receive signals from a number of different sensors connected to the patient, including electrocardiograph ("ECG") signals from electrodes, or respiratory signals from a respiratory bellows or other respiratory monitoring devices. These signals may be used by the pulse sequence server 110 to synchronize, or "gate," the performance of the scan with the subject's heart beat or respiration.

The pulse sequence server 110 may also connect to a scan room interface circuit 132 that receives signals from various sensors associated with the condition of the patient and the magnet system. Through the scan room interface circuit 132, a patient positioning system 134 can receive commands to move the patient to desired positions during the scan.

The digitized magnetic resonance signal samples produced by the RF system 120 are received by the data acquisition server 112. The data acquisition server 112 operates in response to instructions downloaded from the operator workstation 102 to receive the real-time magnetic resonance data and provide buffer storage, so that data is not lost by data overrun. In some scans, the data acquisition server 112 passes the acquired magnetic resonance data to the data processor server 114. In scans that require information derived from acquired magnetic resonance data to control the further performance of the scan, the data acquisition server 112 may be programmed to produce such information and convey it to the pulse sequence server 110. For example, during pre-scans, magnetic resonance data may be acquired and used to calibrate the pulse sequence performed by the pulse sequence server 110. As another example, navigator signals may be acquired and used to adjust the operating parameters of the RF system 120 or the gradient system 118, or to control the view order in which k-space is sampled. In still another example, the data acquisition server 112 may also process magnetic resonance signals used to detect the arrival of a contrast agent in a magnetic resonance angiography ("MRA") scan. For example, the data acquisition server 112 may acquire magnetic resonance data and processes it in real-time to produce information that is used to control the scan.

The data processing server 114 receives magnetic resonance data from the data acquisition server 112 and processes the magnetic resonance data in accordance with instructions provided by the operator workstation 102. Such processing may include, for example, reconstructing two-dimensional or three-dimensional images by performing a Fourier transformation of raw k-space data, performing other image reconstruction algorithms (e.g., iterative or backprojection reconstruction algorithms), applying filters to raw k-space data or to reconstructed images, generating functional magnetic resonance images, or calculating motion or flow images.

Images reconstructed by the data processing server 114 are conveyed back to the operator workstation 102 for storage. Real-time images may be stored in a data base memory cache, from which they may be output to operator display 102 or a display 136. Batch mode images or selected real time images may be stored in a host database on disc storage 138. When such images have been reconstructed and transferred to storage, the data processing server 114 may notify the data store server 116 on the operator workstation 102. The operator workstation 102 may be used by an operator to archive the images, produce films, or send the images via a network to other facilities.

The MRI system 100 may also include one or more networked workstations 142. For example, a networked workstation 142 may include a display 144, one or more input devices 146 (e.g., a keyboard, a mouse), and a processor 148. The networked workstation 142 may be located within the same facility as the operator workstation 102, or in a different facility, such as a different healthcare institution or clinic.

The networked workstation 142 may gain remote access to the data processing server 114 or data store server 116 via the communication system 140. Accordingly, multiple networked workstations 142 may have access to the data processing server 114 and the data store server 116. In this manner, magnetic resonance data, reconstructed images, or other data may be exchanged between the data processing server 114 or the data store server 116 and the networked workstations 142, such that the data or images may be remotely processed by a networked workstation 142.

Figure 2A:
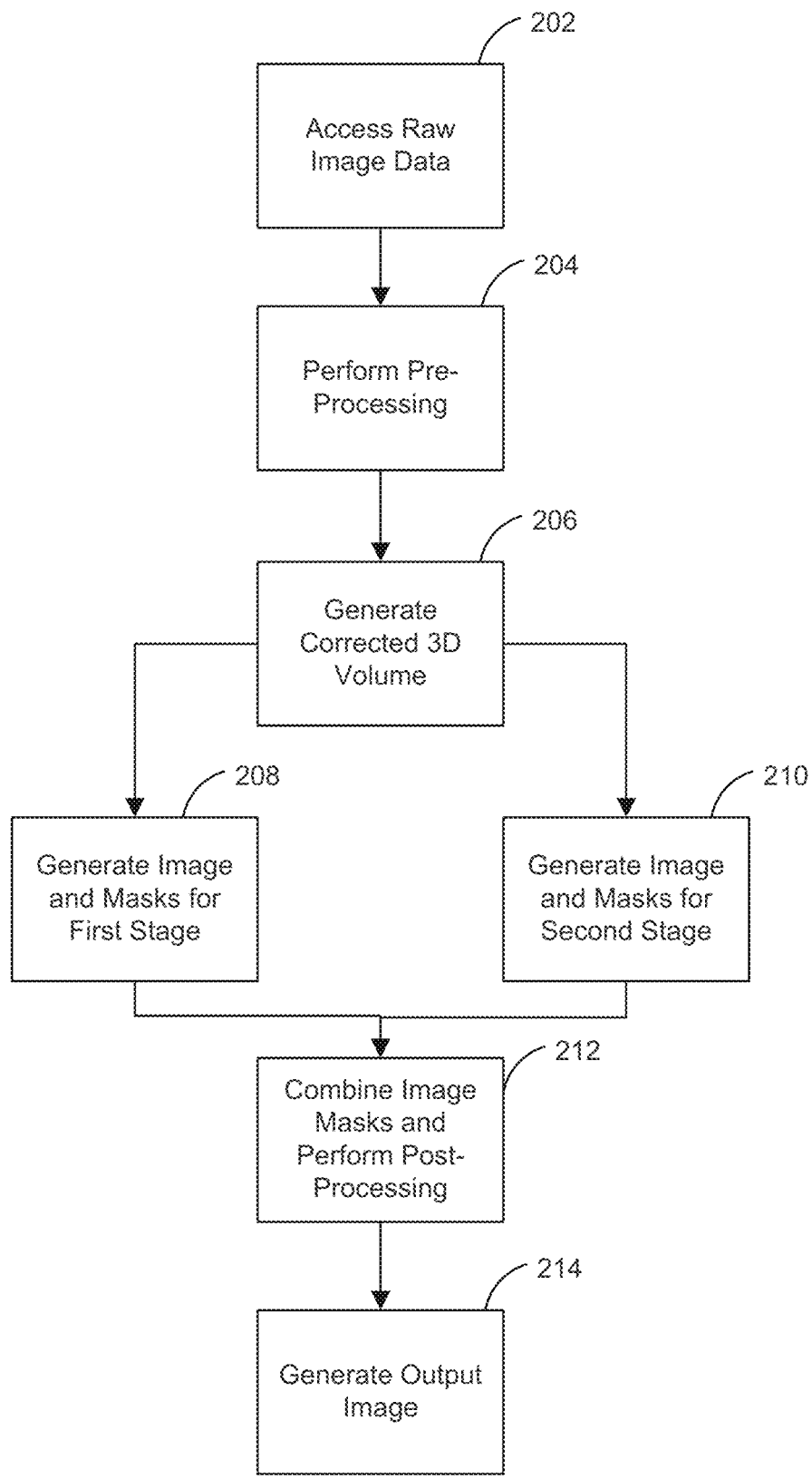
FIG. 2A is a flowchart of non-limiting example steps for a method of muscle and fat segmentation.

Referring to FIG. 2A, a flowchart of non-limiting example steps is shown for a method of muscle and fat segmentation. A raw data image may be accessed or acquired at step 202. An image may include an MR image, a CT image, a 2D or 3D image, a series of images, and the like. An image may be acquired using a medical imaging system, such as an MRI or CT system, or may be accessed from a database, such as medical image archive. Pre-processing may be performed at step 204. Preprocessing may be used to correct for image inhomogeneity due to spatial variations of MR coil sensitivity and/or variabilities in image resolution and/or field-of-view.

Sagittal or near sagittal images of the rotator cuff taken during clinical workflow may suffer from large variabilities in imaging protocols, especially the field-of-view in the medial-lateral direction. For an example, some patient's most medial rotator cuff image ends before the lateral joining of the scapular spine with the scapular body, while other patients exhibit an almost complete coverage of the rotator cuff. During this window, large variations in the scapula and muscle morphology may pose a challenge in training the AI to segment 3D volumes across patient populations and injury severity than only segmenting a 2D slice. To address this variation, the pre-processing steps may include following the pre-processing, as opposed to resizing the entire image to fit a single predetermined size. In a non-limiting example, pre-processing may also include a random patch sliding window method.

A corrected 3D volume may be generated at step 206. A first stage for generating images and masks using a machine learning or AI system is at step 208. A second stage for generating images and masks using a machine learning or AI system is at step 210. In order to accurately evaluate both the muscle atrophy and fatty infiltration, the segmentation of both individual muscles and fat may be used. Different than the muscles, which often have a pre-defined anatomical shape and locations, fat can have a diffuse and non-local pattern. For conventional solutions, it is very challenging to train a single AI to accurately segment both muscle and fat tissues. The first stage and second stage at step 208 and 210 provide for a two-stage model to define two distinct tasks and train two models. In some configurations, to validate performance, comparison models may be used. A comparison model may include a single stage neural network for both muscle and fat. Another comparison model may be a single stage neural network for only muscle segmentation, with a post processing step utilizing an adaptive Otsu filter within each segment muscle for fat segmentation.

The images and masks may be combined at step 212, and post-processing may be performed. The outputs from both models from step 208 and step 210 may be combined to form a map at step 212, in which the fat can be distinguished as extra- or intra-muscular fat for specific muscles. An output image, which may be displayed for a user, may be generated at step 214. In some configurations, key quantitative biomarkers may be calculated for the output image.

Figure 2B:
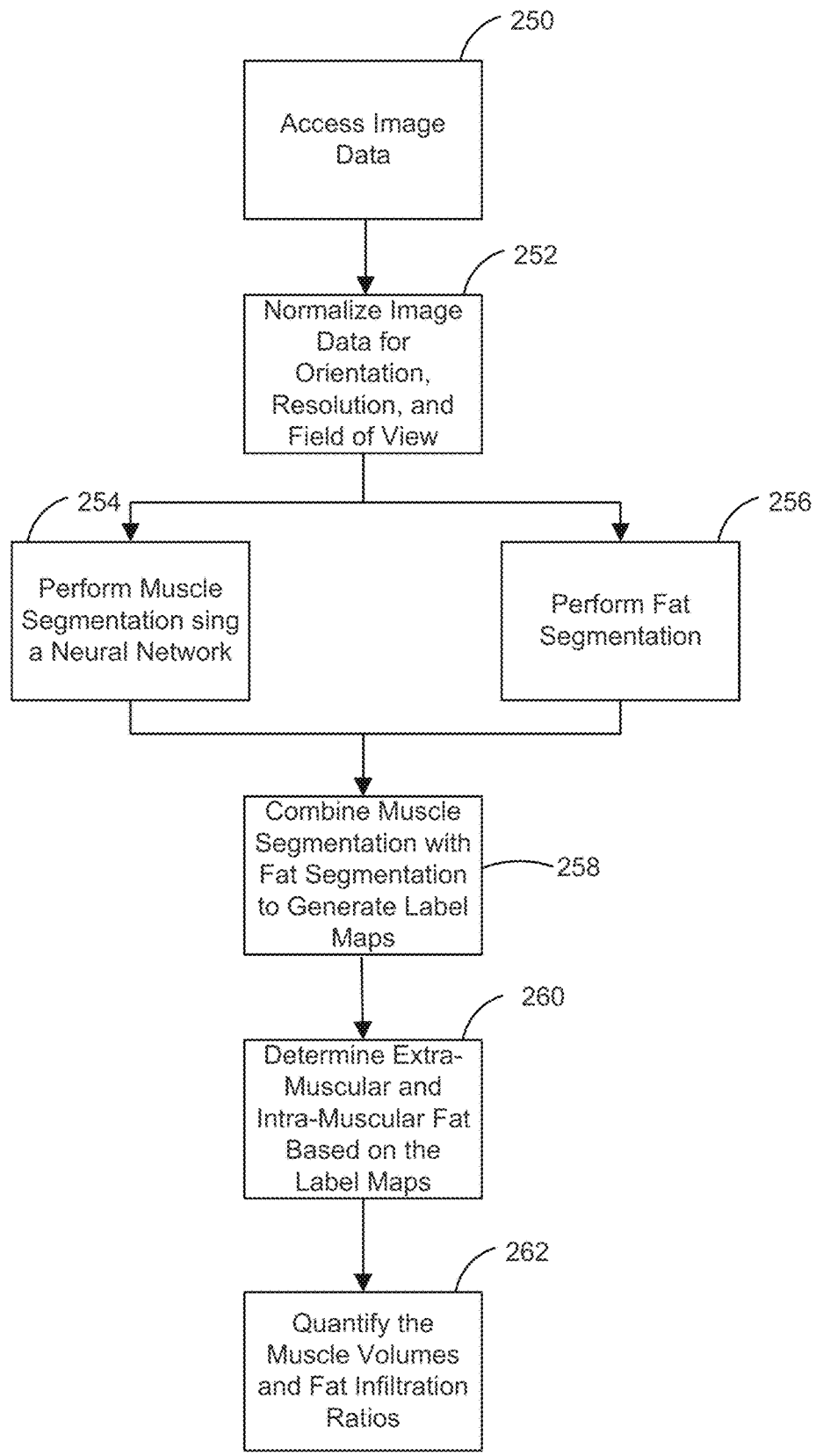
FIG. 2B is another flowchart of non-limiting example steps for a method of muscle and fat segmentation with quantitative assessment.

Referring to FIG. 2B, another flowchart of non-limiting example steps is shown for a method of muscle and fat segmentation. A raw data image may be accessed or acquired at step 250. As above, an image may include an MR image, a CT image, a 2D or 3D image, a series of images, and the like. An image may be acquired using a medical imaging system, such as an MRI or CT system, or may be accessed from a database, such as medical image archive. Normalizing the image for its orientation, resolution and field-of-view may be performed at step 252. Segmenting at least one muscle in the image may be performed using a neural network, such as a deep convolutional neural networks (DCNN) with multiple outputs at step 254. Segmenting fat in the image using another neural network with binary output may be performed at step 256. Optionally, segmentation may also be performed for a soft tissue structure, that may include a tendon, scar tissue, or edema. Combining the fat segmentation with the muscle segmentation may be performed at step 258 to generate label maps, which label the structures in the segmented image as being the identified muscle and/or fat, and/or soft tissue. Extramuscular and/or intra-muscular fat may be determined or distinguished based on the label maps at step 260. Quantifying the muscle volumes and the fat infiltration ratios may be performed at step 262.

Figure 3A:
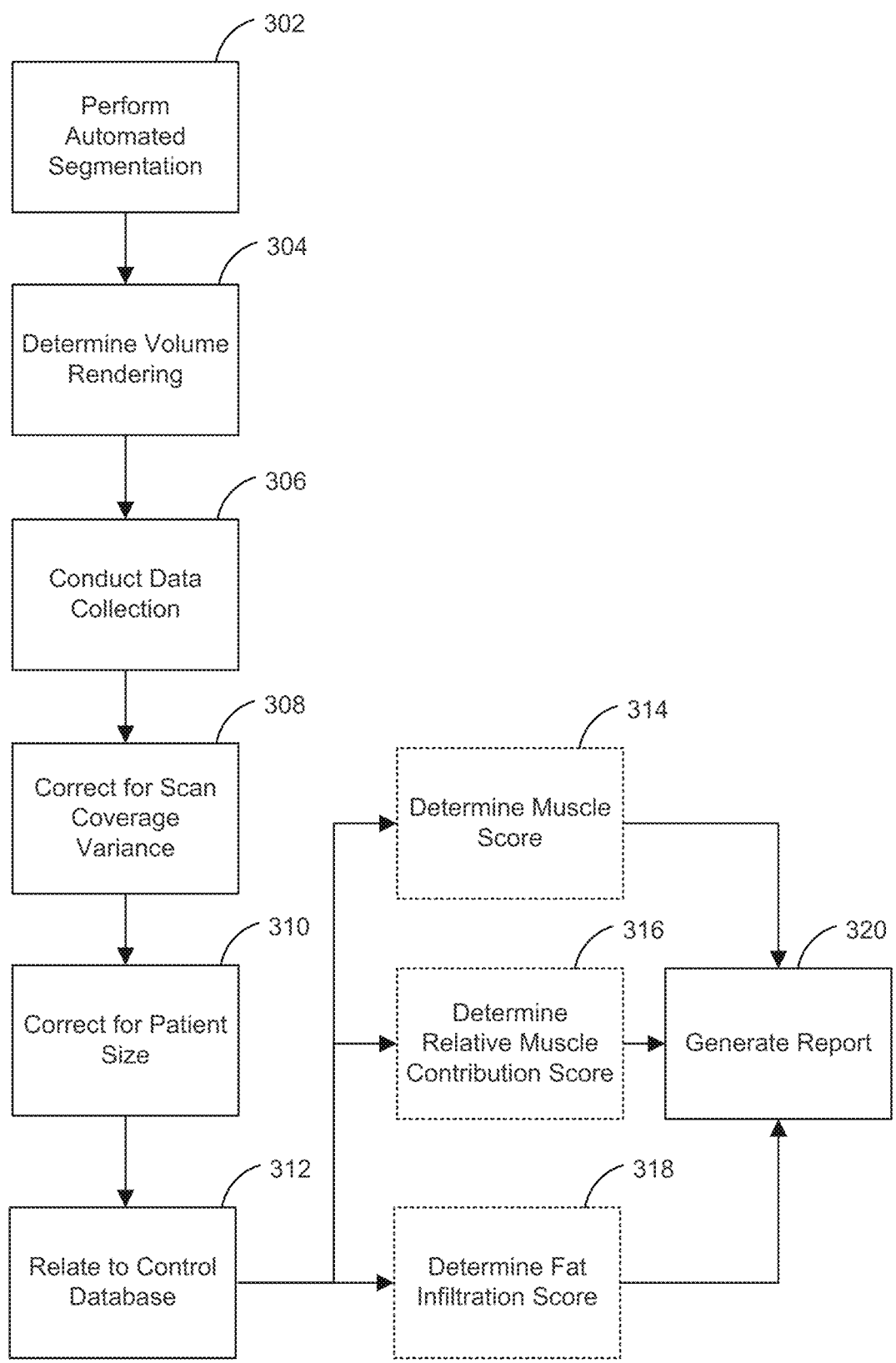
FIG. 3A is a flowchart of non-limiting example steps for a method of automated analysis with quantitative assessment.

Referring to FIG. 3A, a flowchart of non-limiting example steps is shown for a method of automated segmentation. An automated segmentation may be performed at step 302, which may include an AI segmentation. In a non-limiting example, sagittal T1 images of patient's rotator cuff may be segmented using an AI algorithm and vetted by trained segmentation engineers. Regions of interest (RoI) may be identified in the segmentation process and may include: scapula bone, clavicle bone, humerus bone, supraspinatus muscle, supraspinatus intramuscular fat, infraspinatus muscle, infraspinatus intramuscular fat, teres minor muscle, teres minor intramuscular fat, subscapularis muscle, subscapularis intramuscular fat, and the like.

Volume rendering may be determined at step 304. Segmentations and pixel spacing may be used to create a 3D volume rendering of each RoI. Data collection may be conducted at step 306. Data collection may include determining a cumulative volume of each RoI that is measured as a function of a determined distance over the bone. In a non-limiting example, data collection includes determining a distance over the bone from lateral to medial (or slice) along a scapula. Each RoI may exhibit a specific curve when plotted as cumulative volume vs. medial distance into scapula.

A correction for scan coverage variance may be performed at step 308. Scans may not be performed uniformly, such as between different image acquisition protocols, between different scanners, between different scans, or between different workflows, and the like. Retrospective scans taken during typical clinical workflow may also suffer from variations. Typically, there is large variation of where the scan stops within the subject, such as within a scapula, from scan to scan. In some configurations, to address the variations and provide for comparison between scans, data may be determined as a function of distance on the bone as a percentage of total bone length, such as a distance on a scapula as a percentage of total scapula length. In a non-limiting example when plotted as a function of distance, peak scapula CSA may appear when the coracoid joins the scapula body. The distance from when the scapula first appears laterally to the peak CSA may be used to estimate a percent distance into scapula. Additional description for a correction for scan coverage is described below for FIG. 3B.

Patient size may be corrected at step 310. With muscle size determined as a function of relative distance into a bone (e.g. as a percent), muscle size may be normalized between subject size. Bone volume, such as a scapula bone volume, may be correlated to muscle volume. In a non-limiting example, as a function of percent distance into the scapula, each muscle volume may be divided by scapula volume.

Optionally, the processed images may be related to a control database at step 312. Normalized muscle volume as a function of relative medial distance on a bone, such as a scapula, may provide for comparisons between scans and patients. In some configurations, the reference population is continuously grown with new data. Each reference population may be checked for normative distribution as a function of relative medial distance on a bone, such as the scapula.

In a non-limiting example, each rotator cuff patient was compared to a reference control population. Control patients were patients without rotator cuff injuries. The control population was split to two groups by age: 30-49, and 50-80. The mean and standard deviation of expected muscle size or other measures, such as relative muscle contribution, were found as a function of relative medial distance on scapula. The average z-score from where the coracoid meets the scapula body to the medial end of the scan was then found as a function of relative medial distance on scapula.

In some configurations, a muscle score may be determined as indicated at optional step 314. A muscle score may be used to indicate a quality or quantity of muscle in an RoI. In a non-limiting example, a rotator cuff volume may be compared to controls to determine a muscle score. For example, the present disclosure recognizes that supraspinatus and infraspinatus are positively correlated. Specifically, a decrease in supraspinatus size is likely shown with a decreased infraspinatus size and vice versa. Comparing each rotator cuff's normalized muscle volume with include intrarmuscular fat to determine a muscle score may support a clinical interpretation for the condition or quality of the muscle scored.

In some configurations, a relative muscle contribution score may be determined as indicated at optional step 316. A relative muscle contribution score may provide for a determination of each muscle's contribution to a total muscle volume in an RoI. In a non-limiting example, the percent each rotator cuff's muscle volume contributes to the total of all four rotator cuffs total muscle volume may be determined and compared to controls. For example, the present disclosure recognizes that the infraspinatus and subscapularis are negatively correlated. The supraspinatus is negatively correlated with the subscapularis and teres minor, but positively correlated with the infraspinatus. Thus, decreased contribution of the supraspinatus and infraspinatus likely occur together.

In some configurations, a fat infiltration score may be determined, as indicated at optional step 318. Fat infiltration may be determined by the presence of fat in the muscle in the RoI. In a non-limiting example, the percentage of the rotator cuff's total muscle volume that contains intramuscular fat may be determined. The supraspinatus and infraspinatus are positively correlated, as well as the infraspinatus and teres minor. Fat infiltration in one is likely seen by fat infiltration in the other.

Using one or more of the scores determined at steps 314, 316, and 318 a report can be generated at step 320 that communicates a clinical indication. For example, relationship of the different scores can be used, with a database of prior scores or data that provides linear regression correlating the score(s) with particular clinical indications, including prognosis, either pre-surgically or post-surgically.

In some configurations, a rotator cuff tear may be assessed or determined. A muscle size may be determined for each segmented muscle in a RoI, and the relative rotator cuff contributions may be determined for each muscle in the RoI. Fat infiltration for each muscle may also be determined as described above.

Figure 3B:
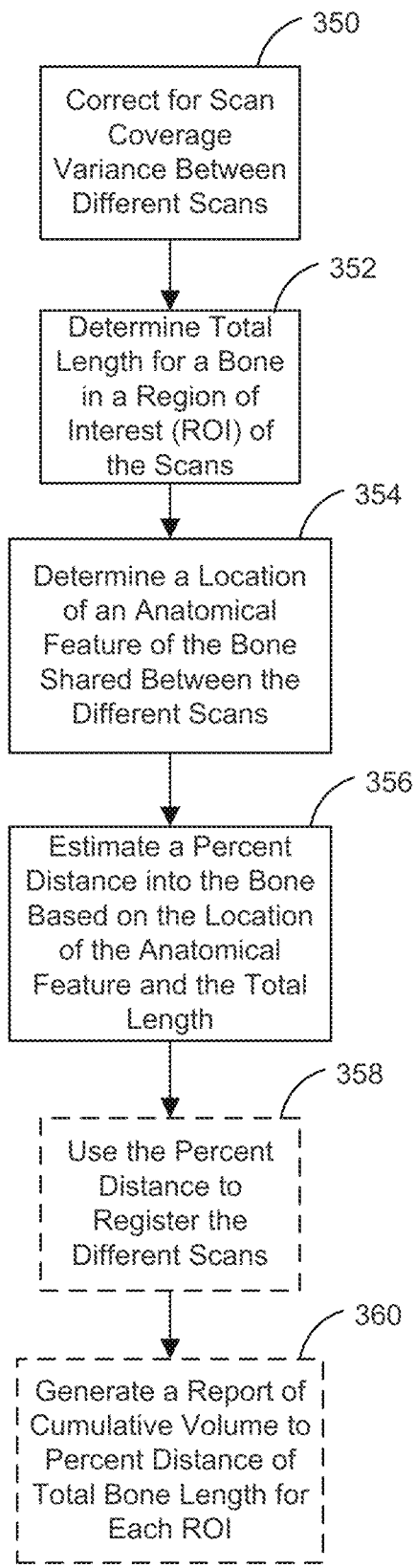
FIG. 3B is a flowchart of non-limiting example steps for a method of automated image correction that may be used in accordance with the present disclosure.

Referring to FIG. 3B, a flowchart of non-limiting example steps for an automated image correction method that may be used for correction of scan coverage variance is shown. Image scans may not be performed uniformly, such as between different image acquisition protocols, between different scanners, between different scans, or between different workflows, and the like. Retrospective scans taken during typical clinical workflow may also suffer from variations. Typically, there is large variation of where the scan stops within the subject, such as within a scapula, from scan to scan. To correct for scan coverage variation between scans at step 350, and to provide for comparison between scans, data may be determined as a function of distance on the bone as a percentage of total bone length. A total length for a bone in a region of interest (ROI) of the scans may be determined at step 352. A location of an anatomical feature of the bone that may be shared between the different scans may be determined at step 354. In a non-limiting example, the anatomical feature may be a cross-sectional area (CSA) of the bone, such as a maximum of CSA, or may be a location where tissue/muscle attaches to the bone, and the like. From when the bone first appears in the scan to the anatomical feature may be used along with the total length of the bone to determine a percent distance into the bone that the scan depicts at step 356. This percent distance into the bone may optionally be used to register the different scans together at step 358, or may be used to generate a report graphing the cumulative volume to the percent distance for each ROI at step 360.

In a non-limiting example, when plotted as a function of distance, peak scapula CSA may be used as an anatomical feature and may appear when the coracoid joins the scapula body. The distance from when the scapula first appears laterally to the peak CSA may be used to estimate a percent distance into the scapula. Cumulative volume of each RoI may be measured as a function of lateral to medial distance (or slice) along the scapula. Each RoI may exhibit a specific curve, in a similar manner to a fingerprint. That is, the curve of the scapula and supraspinatus may present differently allowing a user to distinguish the bones based on the graphs of cumulative volume to percent distance.

Figure 3C:
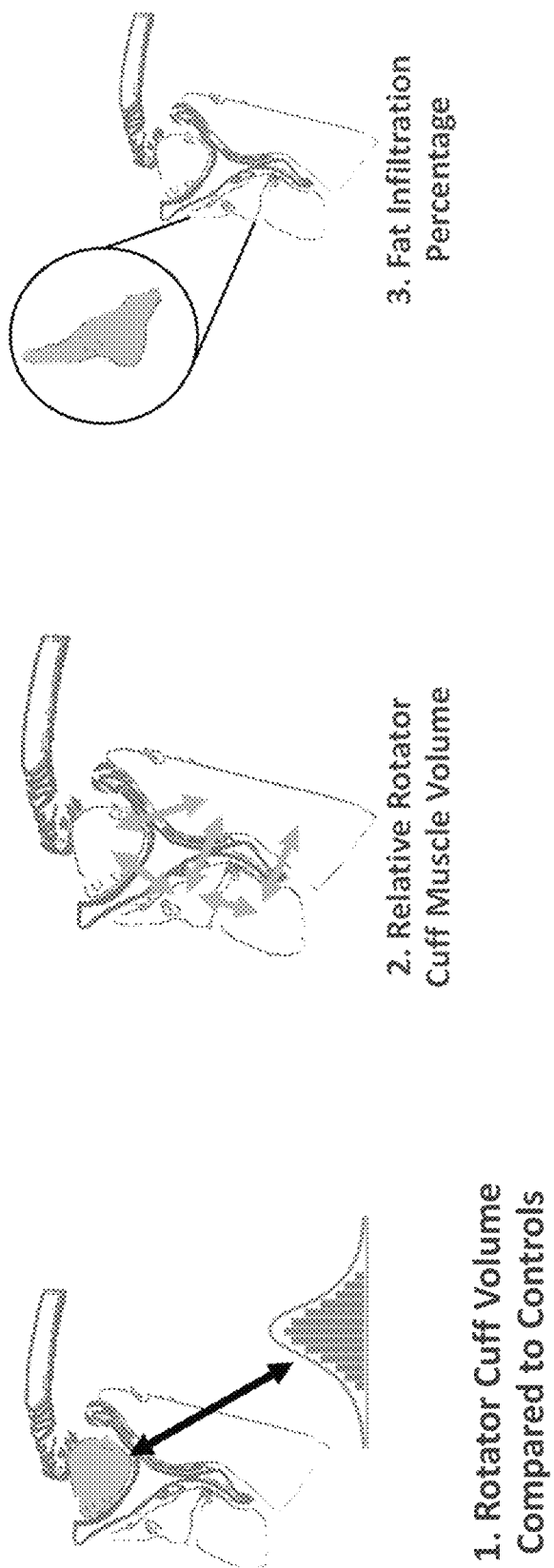
FIG. 3C shows non-limiting graphic illustration of a process for generating reports in accordance with the present disclosure

Referring to FIG. 3C, non-limiting graphic example in accordance with the present disclosure is shown. For example, when generating the above-described report(s), a rotator cuff volume may be assessed be compared to control data. A rotator cuff volume report may be used to compare each rotator cuff's normalized muscle volume, which may include intramuscular fat. As another non-limiting example, a Relative rotator cuff muscle volume may be assessed and may be used to determine the percent each rotator cuffs muscle volume contributes to the total of all four rotator cuffs total muscle volume, which may include intramuscular fat. The determined percent may be compared to controls. As a further non-limiting example, a fat infiltration percentage may be assessed to determine the percent of the rotator cuff's total muscle volume that contains inrarmuscular fat.

Figure 3D:
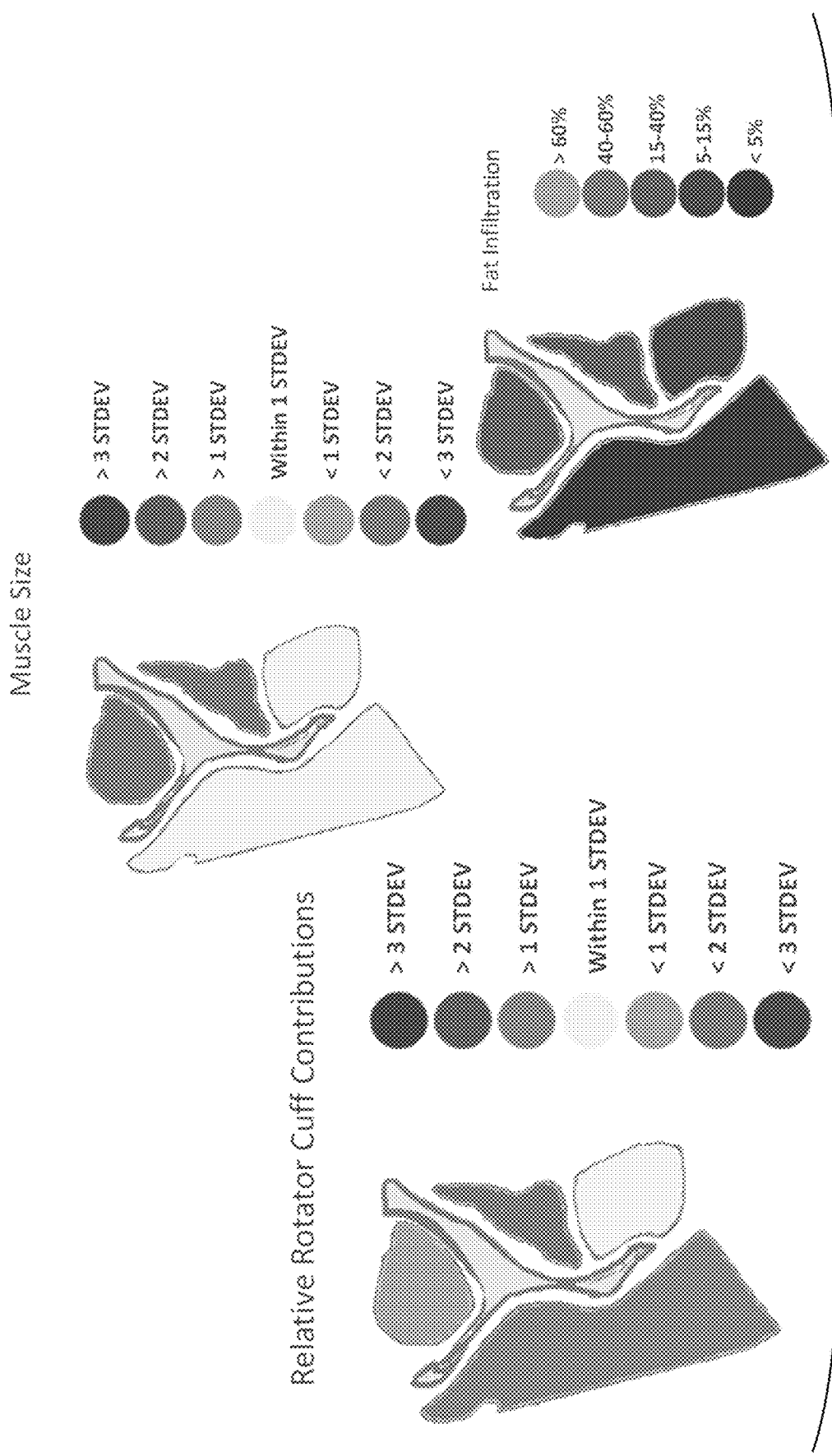
FIG. 3D shows further non-limiting example reports that may be generated in accordance with the present disclosure

Referring still to FIG. 3D, non-limiting examples of reports that may be generated in accordance with the present disclosure are shown. A muscle size report, a relative rotator cuff contributions report, and a fat infiltration report may be generated. In some configurations, the reports may include an image of the anatomy overlayed with a color coding or other illustrations. Thresholds may or quantifications may be provided to distinguish between color changes based upon, for example, standard deviation (STDEV) or percent changes in the report values. In some configurations, a report may display a numerical value for the standard deviation or percent without a color.

Figure 4:
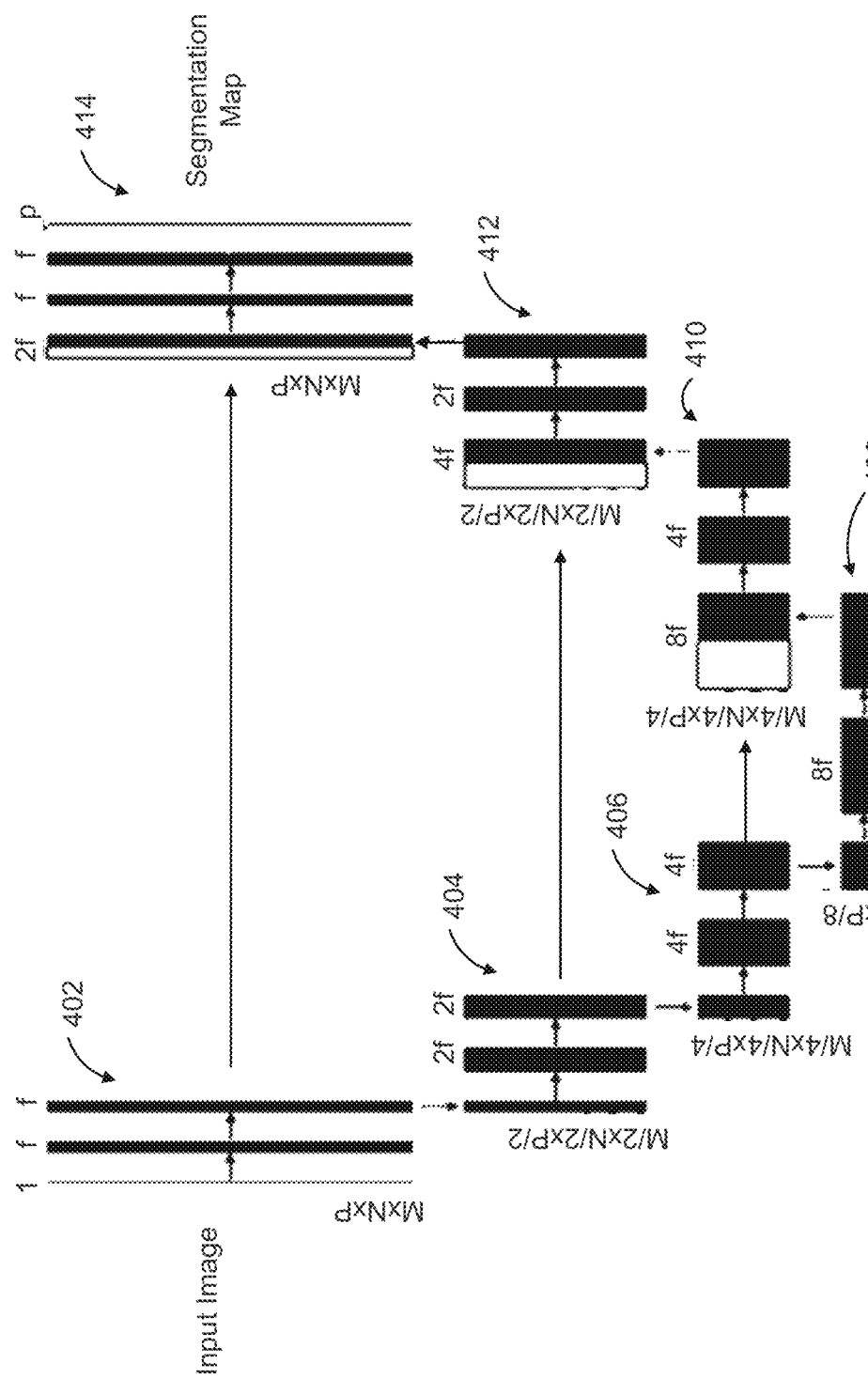
FIG. 4 is a diagram of a non-limiting example network structure that may be used in accordance with the present disclosure.

The above-described processes may be automated to be performed by a computer system or processor of a computer system. In one non-limiting example, artificial intelligence or machine learning may be incorporated into the software that is accessed by the processor to carry out the automated analysis and report generation. Referring to FIG. 4, a non-limiting example network structure is shown. AI models may use a 3D U-Net structure built to segment based on pixelwise prediction maps. The network may follow the structure of 3D U-Net, that includes an encoder 402, 404, 406 and 408, and a decoder 410, 412, and 414, each with four resolution levels. Each level in the encoder contains two blocks of a 3×3×3 convolution layer, a batch normalization (BN) layer, and a rectified linear unit (ReLU) activation layer, followed by a 2×2×2 maxpooling except for the bottom-most level. In the decoder, each level includes a 2×2×2 deconvolution layer, followed by two blocks of a 3×3×3 convolution layer, a BN layer, and a ReLU layer. Feature maps from the encoder may be concatenated to those of the same resolution in the decoder as the skip connection. The final block of the network may contains a 1×1×1 convolution layer to reduce the dimension of the features to match the number of label maps, followed by a pixelwise softmax classifier.

The training input of the model may be maintained as a certain number of pixels due to variations in size of the input images. Instead of resizing the input images, a sliding window may be used. Before training, the sliding windows for a model may be defined using a certain threshold of overlap, such as a 50% overlap. In a non-limiting example, an input image of size 28 slices and a 250×224 matrix may produce 4 windows. During training, one window was randomly selected to act as a patch and produce a robust model. The input image may be resized, reoriented, and bias corrected. An AI model may be run on each window to produce the probabilities of each ROI, in which overlapping pixel's probabilities may be averaged.

An AI model may be trained in two stages. A first stage may be configured to segment the muscle and bone boundaries. For this stage, the training inputs may be the "muscle and bone" masks. A second stage may be configured to segment intramuscular fat independent of which muscle it belonged to. The training inputs for this stage may be the fat masks. Once each of the stage's masks are determined, pixels marked as intramuscular fat from the 2nd stage that were also marked as a specific muscle's RoI in the first stage may then be marked as the specific muscles intramuscular fat. The resulting mask may include segmented RoIs and may be resized and oriented to the input images original form and output.

Postprocessing workflow may include false-positive reduction through connection analysis and binary closing to provide for one connected, dense, and closed 3-D volume kept for each RoI. When combining all RoIs, the network may make a voxel-by-voxel prediction of whether it belonged to each target RoI, and the RoI with maximum probability may form the pixel's resulting label.

Implementation may be based on a neural network framework, such as a TensorFlow framework. Training and testing may be performed on GPUs, and the like. During training, the weights may be initialized randomly from Gaussian distribution and updated using an adaptive moment estimation (Adam) optimizer for gradient descent with a determined initial learning rate and a pixelwise dice loss and cross-entropy as a loss function.

To evaluate the segmentation performance, different metrics may be calculated including a Dice similarity coefficient (Dice), mean surface distance (MSD), percent difference I muscle volumes (V), and percent difference in final intramuscular fat percentage given as (I):

$$\text{Dice} = \frac{S \cap G}{S \cap G}, \quad (3)$$

in which S and G are the automatically segmented RoI label and the ground truth label, respectively. A larger Dice score indicates a larger overlap and more accurate segmentation. The mean distance calculates the average distance between the contour of each segmentation and its corresponding ground truth contour. The distance of a single voxel on one contour to another contour may be given as:

$$d(p,C) = \min_{p' \in C} \|p - p'\|_2, \quad (4)$$

where p is a voxel and C is the contour. The mean of the distances of all voxels may be determined on the segmented contour to the ground truth contour. The volume of each muscle may be used for subsequent analysis together with the performance and injury data, and the accuracy in muscle volume quantification may be used as a criterion for the segmentation quality, which may be calculated by taking the summation of the sizes of all voxels belonging to a muscle m, given as:

$$V_m = \text{sum}_{i \in m}(v_i), \quad (5)$$

In comparison, the percentage differences with the ground truth volumes may be used to eliminate the effect of volume variations among muscles. Due to the small volume sizes of fat in some scans and the purpose of fat infiltration estimates being to quantify percent f fat infiltration per a muscle, the percentage difference in fat infiltration for each muscle with the ground truth volumes may be determined.

Figure 5:
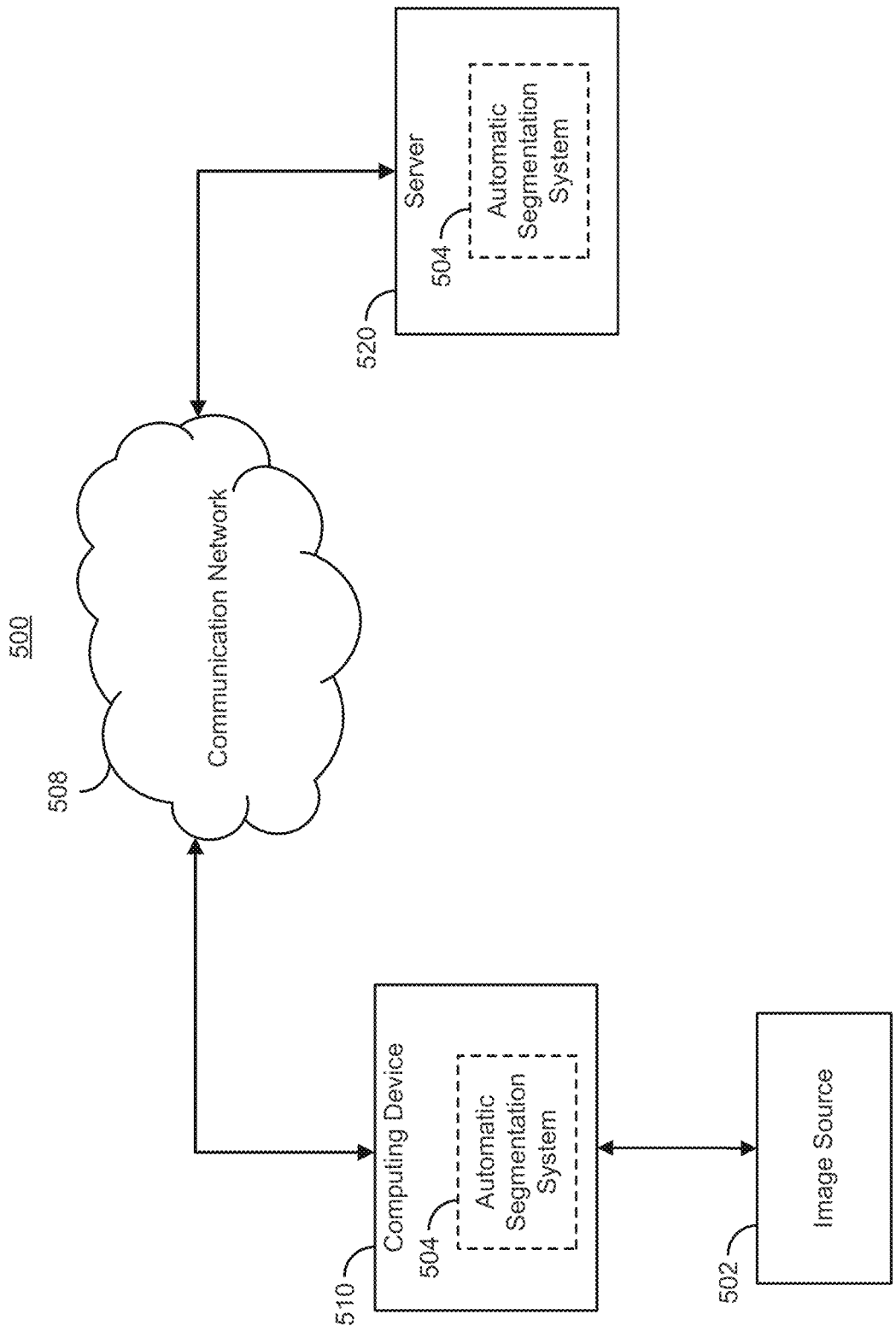
FIG. 5 is a block diagram of a system for automatically segmenting bone, fat, and/or tissue using image data in accordance with some implementations of the disclosed subject matter.

The above described systems and methods may be implemented using a variety of systems and networks. FIG. 5 shows an example 500 of a system for automatically carrying out the processes described above. As shown in FIG. 5, a computing device 510 can receive multiple types of image data from an image source 502. In some configurations, computing device 510 can execute at least a portion of an automatic segmentation system 504 to automatically determine whether bone, fat, or tissue are present in images of a subject and to provide for a quantitative assessment, as described above.

Additionally or alternatively, in some embodiments, computing device 510 can communicate information about image data received from image source 502 to a server 520 over a communication network 508, which can execute at least a portion of automatic segmentation system 504 to automatically determine whether bone, fat, or tissue are present in images of a subject and to provide for a quantitative assessment. In such embodiments, server 520 can return information to computing device 510 (and/or any other suitable computing device) indicative of an output of automatic segmentation system 504 to determine whether bone, fat, or tissue are present in images of a subject and to provide for a quantitative assessment.

In some embodiments, computing device 510 and/or server 520 can be any suitable computing device or combination of devices, such as a desktop computer, a laptop computer, a smartphone, a tablet computer, a wearable computer, a server computer, a virtual machine being executed by a physical computing device, etc. In some configurations, automatic segmentation system 504 can extract features from labeled (e.g., labeled as including a condition or disease, or normal) image data using a convolutional neural network (CNN), UNet, and the like, trained as a general image classifier, and can perform a correlation analysis to calculate correlations between the features corresponding to the image data and a database. In some embodiments, the labeled data can be used to train a classification model, such as a support vector machine (SVM), to classify embodiments as indicative of a bone, tissue, or fat. In some embodiments, automatic segmentation system 504 can provide features for unlabeled image data to the trained classification model and can present a quantitative assessment, such as a fat infiltration score or ratio based on the output of the classification model (e.g., based on which class the SVM identifies the features with).

In some embodiments, image source 502 can be any suitable source of image data, such as an MRI, CT, or another computing device (e.g., a server storing image data), etc. In some embodiments, image source 502 can be local to computing device 510. For example, image source 502 can be incorporated with computing device 510 (e.g., computing device 510 can be configured as part of a device for capturing and/or storing images). As another example, image source 502 can be connected to computing device 510 by a cable, a direct wireless link, etc. Additionally or alternatively, in some embodiments, image source 502 can be located locally and/or remotely from computing device 510, and can communicate image data to computing device 510 (and/or server 520) via a communication network (e.g., communication network 508).

In some embodiments, communication network 508 can be any suitable communication network or combination of communication networks. For example, communication network 508 can include a Wi-Fi network (which can include one or more wireless routers, one or more switches, etc.), a peer-to-peer network (e.g., a Bluetooth network), a cellular network (e.g., a 3G network, a 4G network, etc., complying with any suitable standard, such as CDMA, GSM, LTE, LTE Advanced, WiMAX, etc.), a wired network, etc. In some embodiments, communication network 508 can be a local area network, a wide area network, a public network (e.g., the Internet), a private or semi-private network (e.g., a corporate or university intranet), any other suitable type of network, or any suitable combination of networks. Communications links shown in FIG. 5 can each be any suitable communications link or combination of communications links, such as wired links, fiber optic links, Wi-Fi links, Bluetooth links, cellular links, etc.

Figure 6:
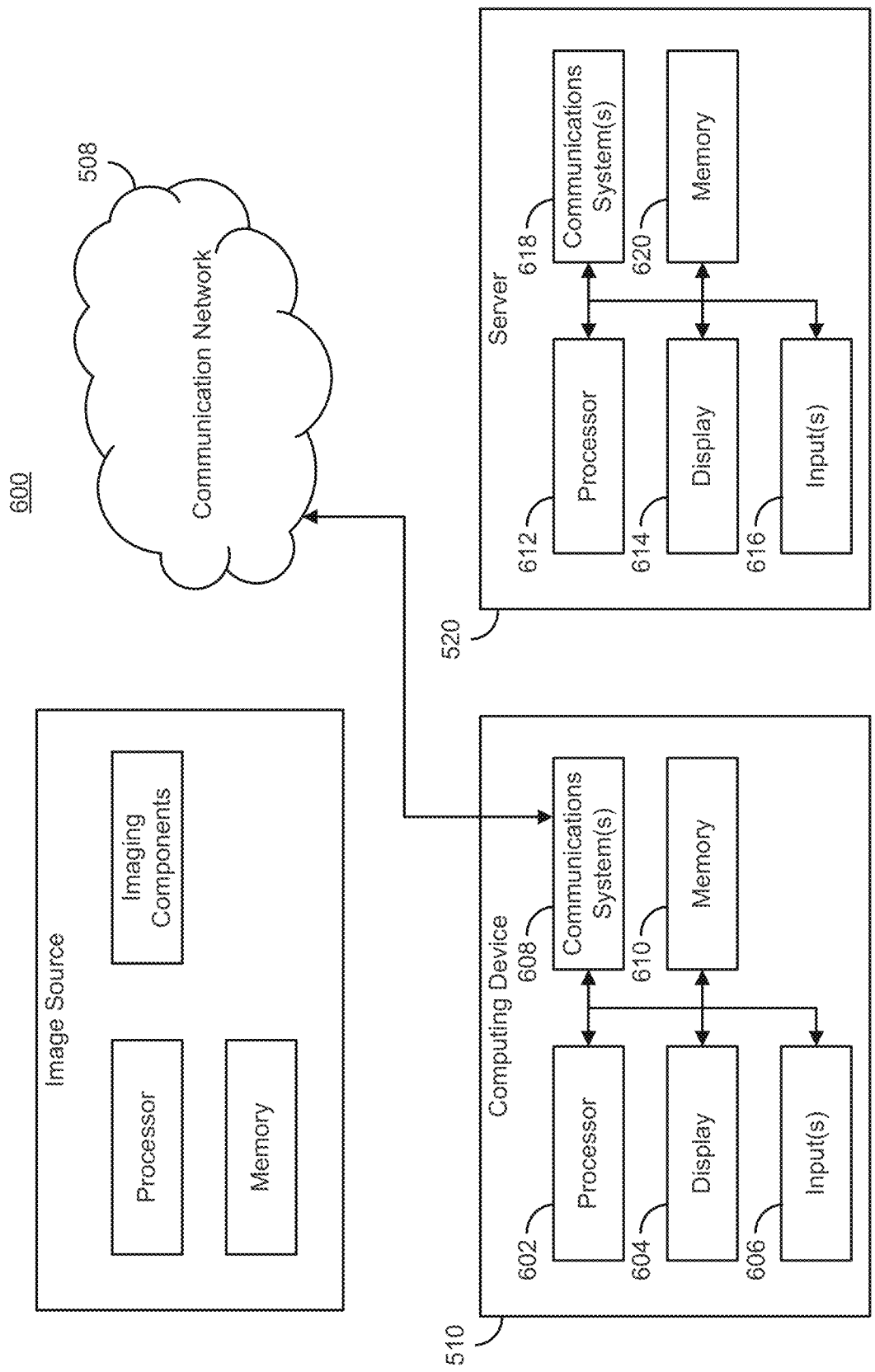
FIG. 6 is a block diagram showing an example of hardware that can be used to implement the system of FIG. 5 in accordance with some implementations of the disclosed subject matter.

FIG. 6 shows an example 600 of hardware that can be used to implement image source 502, computing device 510, and/or server 520 in accordance with some embodiments of the disclosed subject matter. As shown in FIG. 6, in some embodiments, computing device 510 can include a processor 602, a display 604, one or more inputs 606, one or more communication systems 608, and/or memory 610. In some embodiments, processor 602 can be any suitable hardware processor or combination of processors, such as a central processing unit (CPU), a graphics processing unit (GPU), etc. In some embodiments, display 604 can include any suitable display devices, such as a computer monitor, a touchscreen, a television, etc. In some embodiments, inputs 606 can include any suitable input devices and/or sensors that can be used to receive user input, such as a keyboard, a mouse, a touchscreen, a microphone, etc.

In some embodiments, communications systems 608 can include any suitable hardware, firmware, and/or software for communicating information over communication network 508 and/or any other suitable communication networks. For example, communications systems 608 can include one or more transceivers, one or more communication chips and/or chip sets, etc. In a more particular example, communications systems 608 can include hardware, firmware and/or software that can be used to establish a Wi-Fi connection, a Bluetooth connection, a cellular connection, an Ethernet connection, etc.

In some embodiments, memory 610 can include any suitable storage device or devices that can be used to store instructions, values, etc., that can be used, for example, by processor 602 to present content using display 604, to communicate with server 520 via communications system(s) 608, etc. Memory 610 can include any suitable volatile memory, non-volatile memory, storage, or any suitable combination thereof. For example, memory 610 can include RAM, ROM, EEPROM, one or more flash drives, one or more hard disks, one or more solid state drives, one or more optical drives, etc. In some embodiments, memory 610 can have encoded thereon a computer program for controlling operation of computing device 510. In such embodiments, processor 602 can execute at least a portion of the computer program to present content (e.g., MRI images, user interfaces, graphics, tables, etc.), receive content from server 520, transmit information to server 520, etc.

In some embodiments, server 520 can include a processor 612, a display 614, one or more inputs 616, one or more communications systems 618, and/or memory 620. In some embodiments, processor 612 can be any suitable hardware processor or combination of processors, such as a CPU, a GPU, etc. In some embodiments, display 614 can include any suitable display devices, such as a computer monitor, a touchscreen, a television, etc. In some embodiments, inputs 616 can include any suitable input devices and/or sensors that can be used to receive user input, such as a keyboard, a mouse, a touchscreen, a microphone, etc.

In some embodiments, communications systems 618 can include any suitable hardware, firmware, and/or software for communicating information over communication network 508 and/or any other suitable communication networks. For example, communications systems 618 can include one or more transceivers, one or more communication chips and/or chip sets, etc. In a more particular example, communications systems 618 can include hardware, firmware and/or software that can be used to establish a Wi-Fi connection, a Bluetooth connection, a cellular connection, an Ethernet connection, etc.

In some embodiments, memory 620 can include any suitable storage device or devices that can be used to store instructions, values, etc., that can be used, for example, by processor 612 to present content using display 614, to communicate with one or more computing devices 510, etc. Memory 620 can include any suitable volatile memory, non-volatile memory, storage, or any suitable combination thereof. For example, memory 620 can include RAM, ROM, EEPROM, one or more flash drives, one or more hard disks, one or more solid state drives, one or more optical drives, etc. In some embodiments, memory 620 can have encoded thereon a server program for controlling operation of server 520. In such embodiments, processor 612 can execute at least a portion of the server program to transmit information and/or content (e.g., MRI data, results of automatic diagnosis, a user interface, etc.) to one or more computing devices 510, receive information and/or content from one or more computing devices 510, receive instructions from one or more devices (e.g., a personal computer, a laptop computer, a tablet computer, a smartphone, etc.), etc.

In some embodiments, image source 502 can include a processor 622, imaging components 624, one or more communications systems 626, and/or memory 628. In some embodiments, processor 622 can be any suitable hardware processor or combination of processors, such as a CPU, a GPU, etc. In some embodiments, imaging components 624 can be any suitable components to generate image data corresponding to one or more imaging modes (e.g., T1 imaging, T2 imaging, fMRI, etc.). An example of an imaging machine that can be used to implement image source 502 can include a conventional MRI scanner (e.g., a 1.5 T scanner, a 3 T scanner), a high field MRI scanner (e.g., a 7 T scanner), an open bore MRI scanner, a CT system, an ultrasound scanner and the like.

Note that, although not shown, image source 502 can include any suitable inputs and/or outputs. For example, image source 502 can include input devices and/or sensors that can be used to receive user input, such as a keyboard, a mouse, a touchscreen, a microphone, a trackpad, a trackball, hardware buttons, software buttons, etc. As another example, image source 502 can include any suitable display devices, such as a computer monitor, a touchscreen, a television, etc., one or more speakers, etc.

In some embodiments, communications systems 626 can include any suitable hardware, firmware, and/or software for communicating information to computing device 510 (and, in some embodiments, over communication network 508 and/or any other suitable communication networks). For example, communications systems 626 can include one or more transceivers, one or more communication chips and/or chip sets, etc. In a more particular example, communications systems 626 can include hardware, firmware and/or software that can be used to establish a wired connection using any suitable port and/or communication standard (e.g., VGA, DVI video, USB, RS-232, etc.), Wi-Fi connection, a Bluetooth connection, a cellular connection, an Ethernet connection, etc.

In some embodiments, memory 628 can include any suitable storage device or devices that can be used to store instructions, values, image data, etc., that can be used, for example, by processor 622 to: control imaging components 624, and/or receive image data from imaging components 624; generate images; present content (e.g., MRI images, a user interface, etc.) using a display; communicate with one or more computing devices 510; etc. Memory 628 can include any suitable volatile memory, non-volatile memory, storage, or any suitable combination thereof. For example, memory 628 can include RAM, ROM, EEPROM, one or more flash drives, one or more hard disks, one or more solid state drives, one or more optical drives, etc. In some embodiments, memory 628 can have encoded thereon a program for controlling operation of image source 502. In such embodiments, processor 622 can execute at least a portion of the program to generate images, transmit information and/or content (e.g., MRI image data) to one or more computing devices 510, receive information and/or content from one or more computing devices 510, receive instructions from one or more devices (e.g., a personal computer, a laptop computer, a tablet computer, a smartphone, etc.), and the like.

Non-Limiting Example

A validity-confirmation dataset of 120 rotator cuff muscle MRI images were taken retrospectively from two different clinics. All images were T1 MRI images of the sagittal plane taken during typical clinical workflow. Rotator cuff images were taken from patients in two groups: a control group (e.g., patients with no reported rotator cuff injuries, 55 of the scans), and a rotator cuff injury group (e.g., patients with rotator cuff injuries, 65 of the scans). For all images, the in-plane spatial resolution varied about 0.7 mm and slice thickness varied about 3.75 mm with 15 to 50 continuous axial slices in total. These variances in resolution and scan coverage were typical of rotator cuff scans taken during typical clinical practice, insuring a practical training set. 40 controls scans and 60 rotator cuff injury scans were randomly selected for training, and 15 control and 15 rotator cuff injury scans were randomly selected for validation.

Manual segmentation of all muscles was performed and vetted by trained engineers as the ground truth, creating an image and mask. The following structures were vetted and segmented in the subsequent models: humerus, scapula, clavicle, supraspinatus muscle, supraspinatus fat, infraspinatus muscle, infraspinatus fat, teres minor muscle, teres minor fat, subscapularis muscle, and subscapularis fat.

For pre-processing and training, all images were resized to have an in-plane spatial resolution of 0.7 mm and padded (if needed) to achieve in plane matrix size of at least 224×224. Variance in slice thickness and slice number was maintained. Using the masks as reference, the image and masks were then rotated/flipped so that each image constantly began with the most medial scapula image moving laterally and with the subscapularis on the right side. For training the different models, 3 masks were created. The "muscle and bone mask" specified only the boundaries of the muscles and bone, in which RoIs designated as intramuscular fat were relabeled as the corresponding muscle. This resulted in 7 RoIs, 4 for each of the rotator cuff muscles and 3 for each bone. The "fat mask" specified the intramuscular fat segmentations, all intramuscular fat RoI were relabeled as a single RoI and all other segmentations were relabeled to 0. Therefore, there was only 1 RoI. The last masks was the original mask, in which all muscle, bone and intramuscular fat regions of interest are labeled on one mask (total of 11 RoIs). Image inhomogeneity due to radiofrequency field (B1) variations was corrected using improved nonparametric nonuniform intensity normalization (N3) bias correction.

For all AI models a modified 3D U-Net was built to segment based on the pixelwise prediction maps. The network followed the structure of 3D U-Net, which consisted of an encoder and a decoder, each with four resolution levels. Each level in the encoder contained two blocks of a 3×3×3 convolution layer, a batch normalization (BN) layer, and a rectified linear unit (ReLU) activation layer, followed by a 2×2×2 maxpooling except for the bottom-most level. In the decoder, each level consisted of a 2×2×2 deconvolution layer, followed by two blocks of a 3×3×3 convolution layer, a BN layer, and a ReLU layer. In addition, feature maps from the encoder were concatenated to those of the same resolution in the decoder as the skip connection. The final block of the network contained a 1×1×1 convolution layer to reduce the dimension of the features to match the number of label maps, followed by a pixelwise softmax classifier.

The training input of the model was maintained as 24×224×224 pixels (slice×rows×columns). As training and deployed inputs varied in size, instead of resizing, a sliding window was used. Before training, the sliding windows for this model were defined using at most a 50% overlap. As an example, an inputted image of size 28 slices and a 250×224 matrix would produce 4 windows. During training, one window was randomly selected to act as a patch and produce a robust model.

During deployment, the input image was resized, reoriented, and bias corrected (same as the training inputs) and these changes were recorded. Similar to training, a sliding window of size 24×224×224 was used with a 50% overlap. However, the model was run on each window to produce the probabilities of each ROI, in which overlapping pixel's probabilities were averaged.

The model was trained in two stages. The main goal of the first stage was to segment the muscle and bone boundaries. For this stage the training inputs were the "muscle and bone" masks. The main goal of the second stage was to segment all intramuscular fat independent of which muscle it belonged to. The training inputs for this stage was the fat masks. Once each of the stage's masks were determined, pixels marked as intramuscular fat from the 2nd stage that were also marked as a specific muscle's RoI in the first stage were then marked as the specific muscles intramuscular fat. The resulting mask then included 11 segmented RoIs and were resized and oriented to the input images original form and outputted.

Postprocessing workflow included false-positive reduction through connection analysis and binary closing to guarantee that only one connected, dense and closed 3-D volume was kept for each RoI. When combining all RoIs, since the network makes a voxel-by-voxel prediction of whether it belonged to each target RoI, the RoI with maximum probability was the pixel's resulting label.

Implementation was based on the TensorFlow framework and training and testing were performed on two 1080Ti GPUs with 11 Gb memory each available from NVIDIA Corporation. NVIDIA® is a trademark owned by the NVIDIA Corporation of Santa Clara, CA. During training, the weights were initialized randomly from Gaussian distribution and updated using the adaptive moment estimation (Adam) optimizer24 for gradient descent with an initial learning rate of 0.01 and the pixelwise dice loss and cross-entropy as the loss function. Due to memory limitations, the batch size was set to be 1. Extensive data augmentation including shearing, rotation, and left-right flipping was applied in the training process. The training time for a stage was about 10 hours with 100 epochs. The validation time was less than 1 minute per a scan on average with a single GPU.

Non-Limiting Example Comparison Study

A comparison model of a single stage muscle and fat segmentation was trained in a single stage in which the model segmented for muscle, bone, and intramuscular fat. The model was trained on the "original" masks which contained all RoIs. The resulting mask then included 11 segmented RoIs and were resized and oriented to the input images original form and outputted.

A second comparison model of a single stage muscle detection and Otsu filter fat segmentation was trained in a single stage in which the model segmented for muscle and bone. The training inputs were the "muscle and bone" masks. The resulting mask then included 7 segmented RoIs and were resized and oriented to the input images original form and outputted. After output, a skimage Otsu filter was used to determine the threshold between muscle and fat detection. This was done per a slice, per the specified muscle's RoI as designated by the model in the first stage. Pixels above the threshold and labeled by muscle were then relabeled as the muscle's intramuscular fat. This was done for all for muscles and the final mask was outputted.

To evaluate the segmentation performance, different metrics were calculated including the Dice similarity coefficient (Dice), mean surface distance (MSD), percent difference I muscle volumes (V), and percent difference in final intramuscular fat percentage.

The results showed that the AI model is superior when compared to the other 2 comparison models. The muscle and bone volume segmentation produced high Dice scores, low MSD and low volume error.

The present disclosure has described one or more preferred embodiments, and it should be appreciated that many equivalents, alternatives, variations, and modifications, aside from those expressly stated, are possible and within the scope of the invention.

The invention claimed is:

1. A system for generating a report providing information regarding a clinical diagnosis or prognosis from medical images, the system comprising:
   a memory configured to store a plurality of a medical images of an upper extremity of a subject;
   a processor configured to access the plurality of medical images of the upper extremity of the subject stored in the memory and configured to:
      segment the plurality of images based on at least muscle, fat, and bone;
      identify and correct images for scan coverage variance based on a function of a distance on a bone as a percentage of total length of the bone;
      determine at least one of extra-muscular fat or intra-muscular fat using segmentation of the plurality of images;
      quantify at least one of structural volume, muscle volume, or fat infiltration in the upper extremity of the subject using the segmentation of the plurality of images and the determined at least one of extra-muscular fat or intra-muscular fat; and
      generate a report providing information indicating pre-surgical or a post-surgical diagnosis or prognosis for the upper extremity including at least the muscle volume or fat infiltration ratio.

2. The system of claim 1, further comprising an artificial intelligence system configured to segment the plurality of images.

3. The system of claim 1, wherein the upper extremity of the subject includes a rotator cuff and the diagnosis or prognosis includes surgical repair of the rotator cuff.

4. The system of claim 1, wherein the processor is further configured to normalize the plurality of medical images for at least one of orientation, resolution, patient size, or field-of-view before segmenting.

5. The system of claim 1, wherein the plurality of medical images includes three-dimensional (3D) images of the upper extremity.

6. The system of claim 1, wherein the processor is further configured to segment at least one soft tissue structure in the plurality of medical images using an artificial intelligence network to segment at least one of edema, tendon, or scar.

7. The system of claim 1, wherein the processor is further configured to determine quantitative metrics of muscle and fat volume, and at least one of extra- or intra-muscular fat percentage, and further comprising a display configured to display maps showing quantitative metrics of muscle and fat volume and at least one of extra- or intra-muscular fat percentage.

8. The system of claim 7, wherein the processor is further configured to determine a function based on a cumulative segmented volume as a function of distance along specified axis of segmented image data to generate at least some of the quantitative metrics.

9. The system of claim 1, where the processor is configured to compare the at least one of the structural volume, muscle volume, or fat infiltration in the upper extremity of the subject to a database to determine the pre-surgical or post-surgical prognosis.

10. The system of claim 1, wherein to identify and correct images for scan coverage variance based on the function of a distance on a bone as a percentage of total length of the bone, the processor is further caused to:
    determine a total length for the bone in a region of interest (ROI) of the image data;
    determine a location of an anatomical feature of the bone in the ROI that may be shared between the different images in the image data;
    determine a percent distance into the bone that the scan depicts or a total length of the bone; and
    use the percent distance to register the different images together or to generate a report displaying a cumulative volume to the percent distance across the different images.

11. The system of claim 10, wherein the anatomical feature includes at least one of a cross-sectional area (CSA) of the bone or a location where tissue or muscle attaches to the bone.

12. A computer-implemented method for automatic muscle, fat, and bone segmentation using at least one processor, the method comprising:
    accessing image data acquired by a medical imaging system;
    segmenting at least one bone in the image data using an artificial intelligence network
    analyzing the image data and correcting for scan coverage variance based on a function of a distance on the bone as a percentage of a total length of the bone;
    segmenting at least one muscle in the image data using the artificial intelligence network;
    segmenting fat in the image data using the artificial intelligence network;
    generating label maps by combining the fat segmented image data with the muscle segmented image data;
    determining at least one of extra-muscular fat or intra-muscular fat based on the label maps; and
    quantifying muscle volume for the at least one muscle and a fat infiltration ratio based on the determined at least one of extra-muscular fat or intra-muscular fat.

13. The computer-implemented method of claim 12, further comprising normalizing the image data for at least one of orientation, resolution or field-of-view before segmenting.

14. The computer-implemented method of claim 12, wherein the image data includes 3D image data acquired by using a two-dimensional (2D) multi-slice sequence for a magnetic resonance imaging (MRI) scan; and further comprising:
    correcting image data inhomogeneity due to radiofrequency field variations.

15. The computer-implemented method of claim 12, further comprising:
    segmenting at least one soft tissue structure in the image data using the artificial intelligence network,
       wherein the soft tissue structure is an edema, tendon, or scar.

16. The computer-implemented method of claim 15, wherein segmenting the at least one soft tissue structure from the image data includes using a trained convolutional neural network, trained to identify at least one of a tendon, scar tissue, or edema.

17. The computer-implemented method of claim 15, further comprising:

determining quantitative metrics of the at least one soft tissue structure based on segmented image data.

18. The computer-implemented method of claim 12, further comprising:
determining quantitative metrics of muscle and fat volume, and at least one of extra- or intra-muscular fat percentage based on the generated label maps; and
displaying the generated label maps for a user.

19. The computer-implemented method of claim 18, wherein the quantitative metrics include determining a function based on a cumulative segmented volume as a function of distance along specified axis of segmented image data.

20. The computer-implemented method of claim 12, wherein the medical imaging system includes at least one of a computed tomography (CT) or magnetic resonance imaging (MRI) system.

21. The computer-implemented method of claim 12, wherein the artificial intelligence network includes at least one of a convolutional neural network (CNN), a deep convolutional neural network (DCNN), a neural network with multiple outputs, or a neural network with binary output.

22. A system for automatic muscle, fat, and bone segmentation comprising:
a computer system configured to:
i) access image data acquired by a medical imaging system;
ii) segment at least one bone in the image data using an artificial intelligence network;
iii) analyze the image data and correct for scan coverage variance based on a function of a distance on the bone as a percentage of a total length of the bone;
iv) segment at least one muscle in the image data using the artificial intelligence network;
v) segment fat in the image data using the artificial intelligence network;
vi) generate label maps by combining the fat segmented image data with the muscle segmented image data;
vii) determine at least one of extra-muscular fat or intra-muscular fat based on the label maps; and
viii) quantify muscle volume for the at least one muscle and a fat infiltration ratio based on the determined at least one of extra-muscular fat or intra-muscular fat.

23. The system of claim 22, further comprising normalizing the image data for at least one of orientation, resolution or field-of-view before segmenting.

24. The system of claim 22, wherein the image data includes 3D image data acquired by using a two-dimensional (2D) multi-slice sequence for a magnetic resonance imaging (MRI) scan; and
correcting image data inhomogeneity due to radiofrequency field variations.

25. The system of claim 22, further comprising:
segmenting at least one soft tissue structure in the image data using the artificial intelligence network,
wherein the soft tissue structure is an edema, tendon, or scar.

26. The system of claim 25, wherein segmenting the at least one soft tissue structure from the image data includes using a trained convolutional neural network, trained to identify at least one of a tendon, scar tissue, or edema.

27. The system of claim 25, further comprising:
determining quantitative metrics of the at least one soft tissue structure based on segmented image data.

28. The system of claim 22, further comprising:
determining quantitative metrics of muscle and fat volume and at least one of extra- or intra-muscular fat percentage based on the generated label maps; and
displaying the generated label maps for a user.

29. The system of claim 28, wherein the quantitative metrics include determining a function based on a cumulative segmented volume as a function of distance along specified axis of segmented image data.

30. The system of claim 22, wherein the medical imaging system includes at least one of a computed tomography (CT) or magnetic resonance imaging (MRI) system.

31. The system of claim 22, wherein the artificial intelligence network includes at least one of a convolutional neural network (CNN), a deep convolutional neural network (DCNN), a neural network with multiple outputs, or a neural network with binary output.

32. The system of claim 22, wherein to analyze the image data to correct for scan coverage variance based on the function of the distance of the bone as a percentage of the total length of the bone, the computer system is further configured to:
determine the total length for the bone in a region of interest (ROI) of the image data;
determine a location of an anatomical feature of the bone in the ROI that may be shared between the different images in the image data;
determine a percent distance into the bone that the scan depicts or a total length of the bone; and
use the percent distance to register the different images together or to generate a report displaying a cumulative volume to the percent distance across the different images.

33. The system of claim 32, wherein the anatomical feature includes at least one of a cross-sectional area (CSA) of the bone or a location where tissue or muscle attaches to the bone.

34. The system of claim 32, wherein the multiple stages include a stage 0 configured to analyze normal muscle with absence of fat infiltration, a stage 1 configured to analyze muscle containing fat streaks, a stage 2 configured to analyze fat infiltration with overall more muscle than fat, a stage 3 configured to analyze fat infiltration with equal fat and muscle, and a stage 4 configured to analyze fat infiltration with more fat than muscle.

35. The system of claim 22, wherein the artificial intelligence network includes multiple stages.

* * * * *